(12) United States Patent
Pinal et al.

(10) Patent No.: US 8,250,771 B2
(45) Date of Patent: Aug. 28, 2012

(54) MULTIFUNCTIONAL RULER AND PROTRACTOR SET WITH ABILITY TO FORM AND SCALE A NEAR INFINITE NUMBER OF GEOMETRIC SHAPES

(76) Inventors: Frank Pinal, Weehawken, NJ (US); Carlos Alberto Rodriguez, Miami Beach, FL (US)

( * ) Notice: Subject to any disclaimer, the term of this patent is extended or adjusted under 35 U.S.C. 154(b) by 44 days.

(21) Appl. No.: 12/911,216

(22) Filed: Oct. 25, 2010

(65) Prior Publication Data

US 2012/0096725 A1   Apr. 26, 2012

(51) Int. Cl.
*B43L 7/10*       (2006.01)
(52) U.S. Cl. .............................................. 33/471; 33/473
(58) Field of Classification Search .............. 33/471, 33/473, 478, 374
See application file for complete search history.

(56) References Cited

U.S. PATENT DOCUMENTS

| | | | | |
|---|---|---|---|---|
| 550,904 A | * | 12/1895 | Byrne | 33/473 |
| 734,290 A | * | 7/1903 | Witcher | 33/473 |
| 1,216,105 A | * | 2/1917 | Gagnon et al. | 33/473 |
| 1,533,097 A | * | 4/1925 | Byhre | 33/473 |
| 1,632,267 A | * | 6/1927 | Beem | 33/473 |
| 1,691,118 A | * | 11/1928 | Lissy | 33/473 |
| 2,478,347 A | * | 8/1949 | Warrington | 7/150 |
| 3,685,156 A | * | 8/1972 | Arkenberg | 33/434 |
| 4,872,267 A | * | 10/1989 | Anderton | 33/463 |
| 5,732,474 A | * | 3/1998 | Cannon | 33/452 |
| 6,964,111 B1 | * | 11/2005 | Duffield | 33/478 |
| 7,562,463 B2 | * | 7/2009 | Vaes | 33/374 |
| 7,739,806 B1 | * | 6/2010 | Pater | 33/417 |

* cited by examiner

*Primary Examiner* — Christopher Fulton
(74) *Attorney, Agent, or Firm* — Antonio Papageorgiou; Ostrow Kaufman LLP

(57) ABSTRACT

A multifunctional ruler and protractor tool with the ability to form and scale a near infinite number of geometric shapes. The tool comprises both a standalone ruler and protractor unit. Rulers are capable of being added to each other successively, creating straight ruler assemblies of virtually any length. The protractor unit can be slid onto a single ruler or a straight ruler assembly containing any number of consecutively connected rulers, and is capable of fastening another ruler to its sides by a quick connect/disconnect mechanism. The protractor component of the protractor unit pivots, allowing for the creation of angles between rulers that are laterally fastened and slidably engaged to it. The sliding lock on the protractor unit can arrest both rotational and translational motion of the protractor unit along any ruler, if it is manipulated to do so. Multiple rulers and protractors can be connected to form both open and closed, regular and irregular, polygons, and other sided geometric shapes. Geometric configuration can be scaled to larger or smaller sizes.

19 Claims, 20 Drawing Sheets

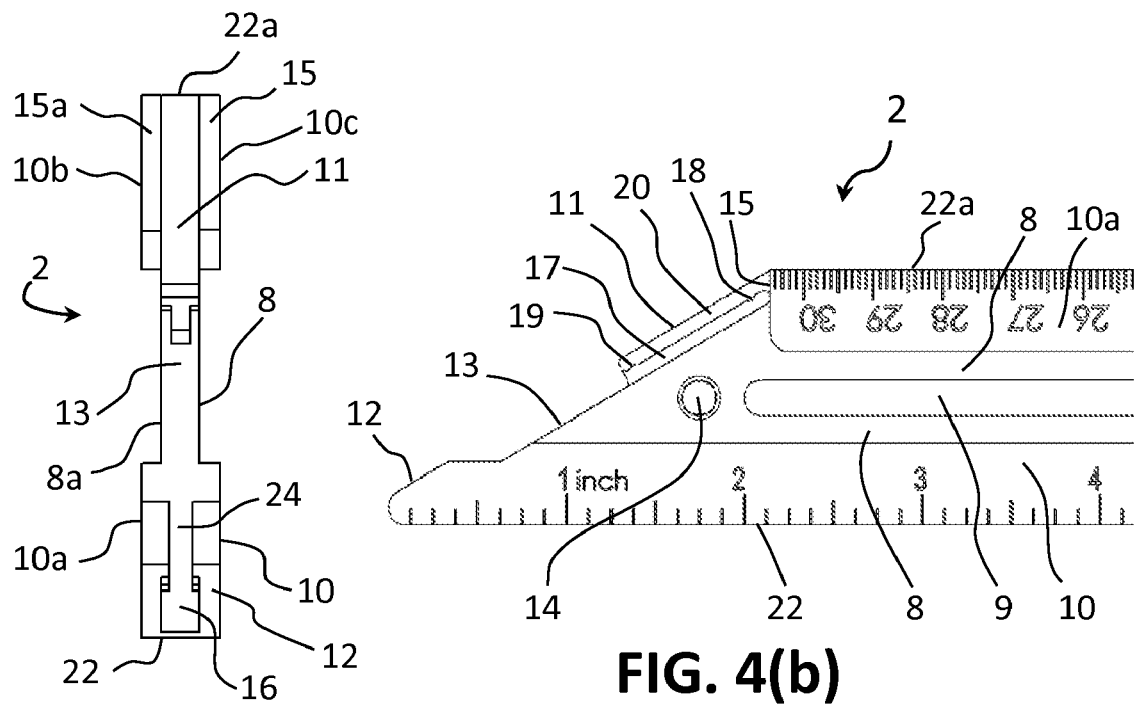
FIG. 4(a)
FIG. 4(b)
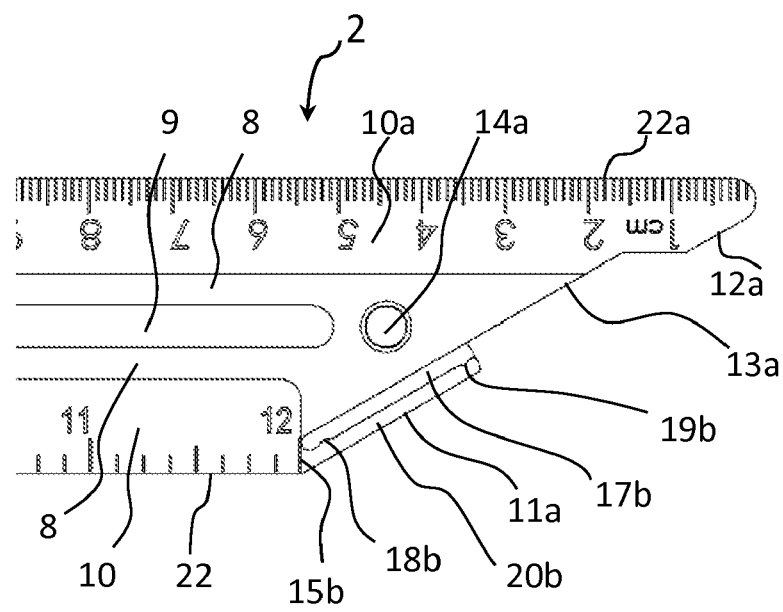
FIG. 4(c)
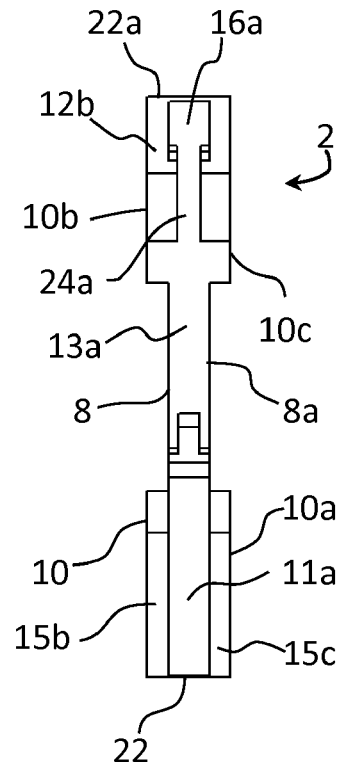
FIG. 4(d)

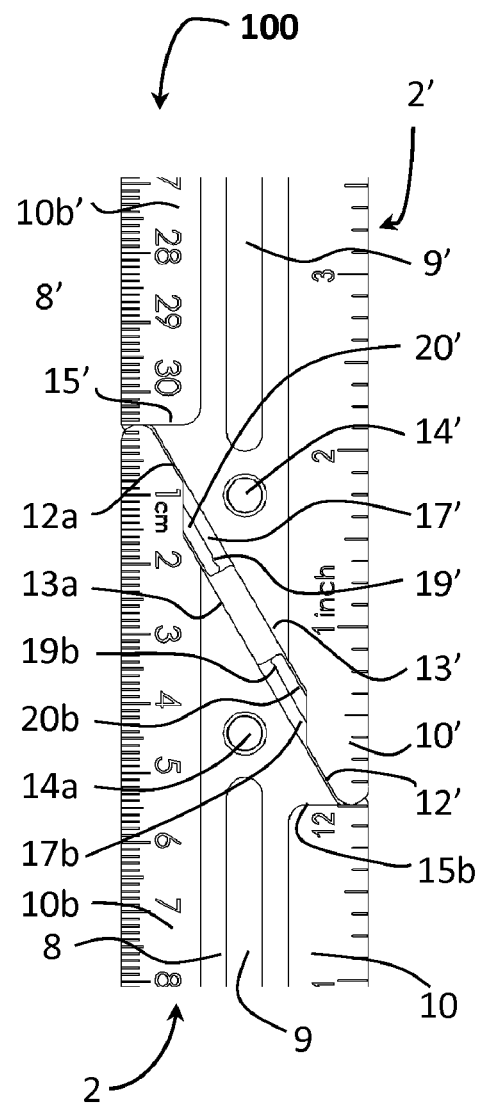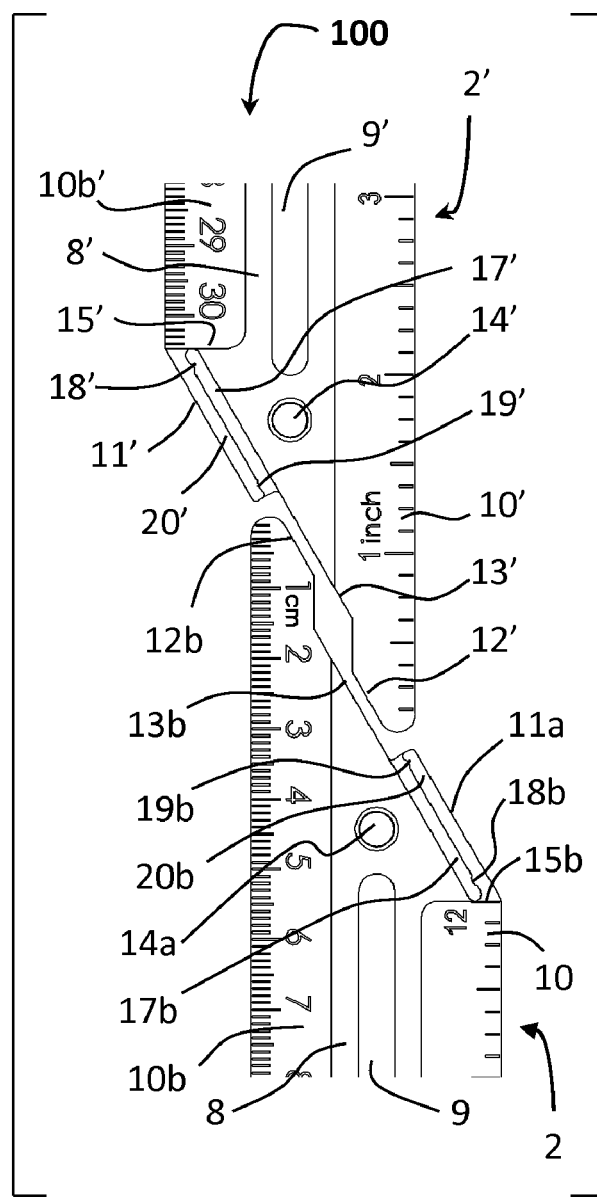

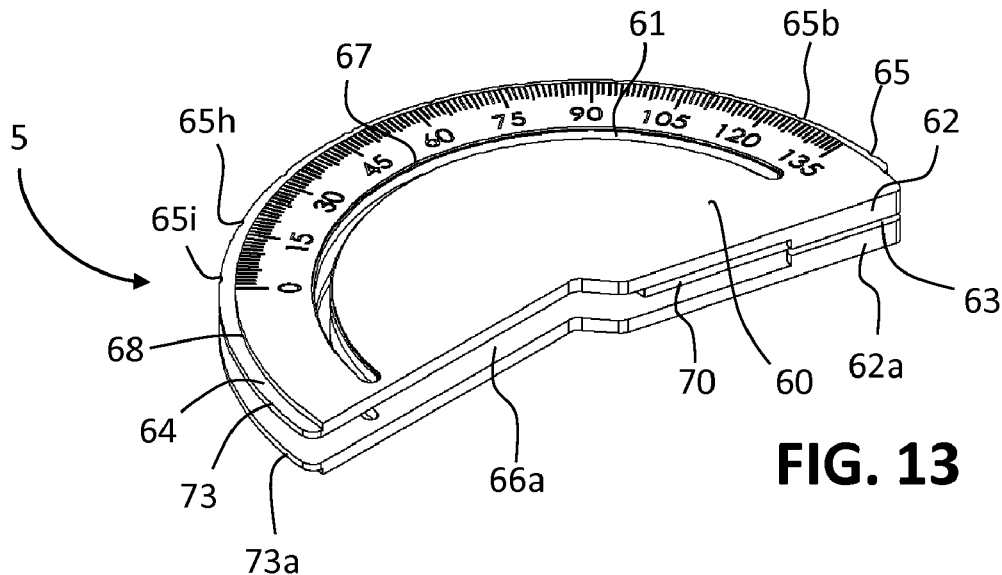
FIG. 13
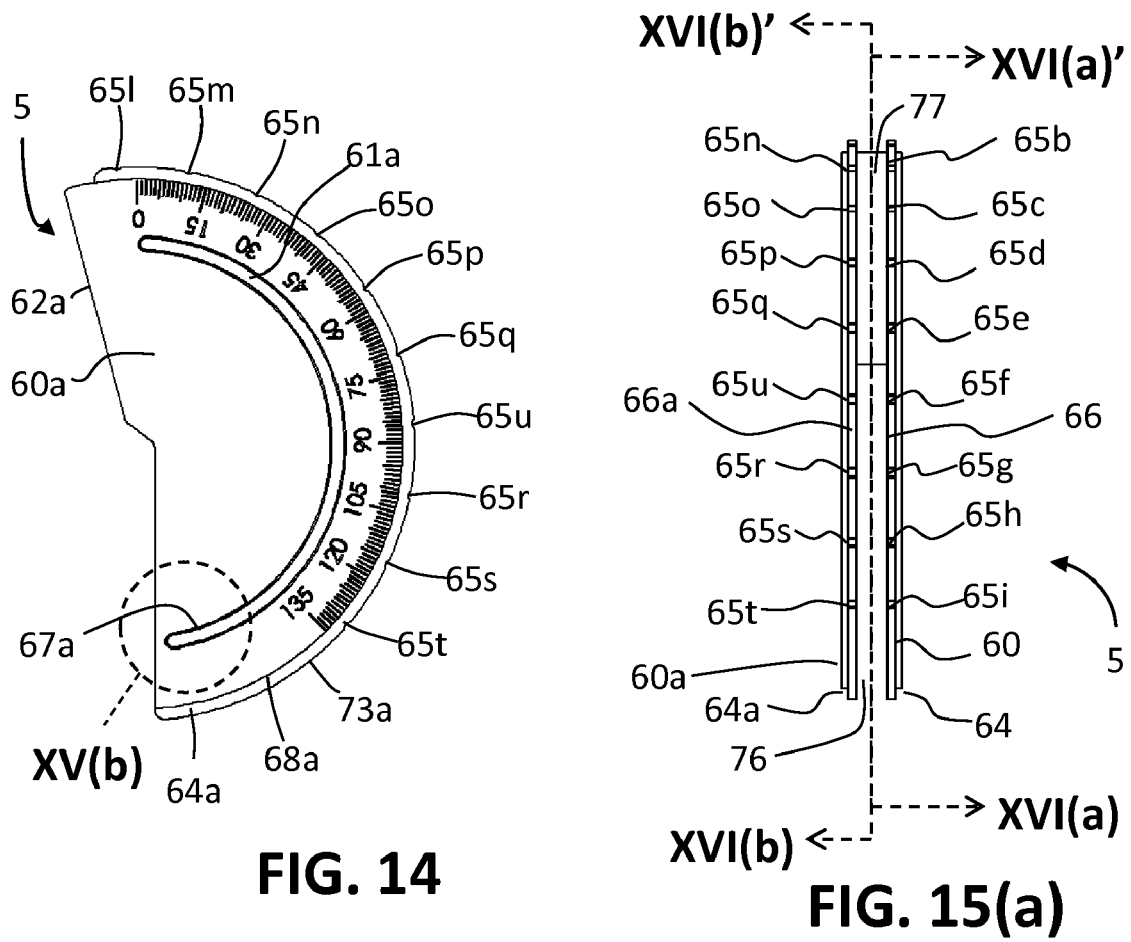
FIG. 14
FIG. 15(a)

FIG. 23
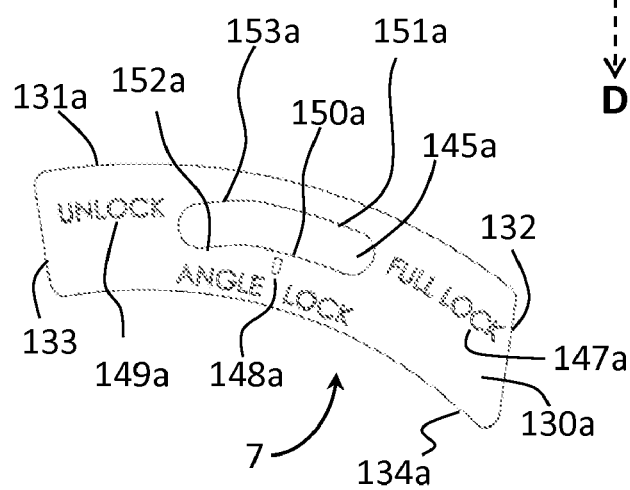
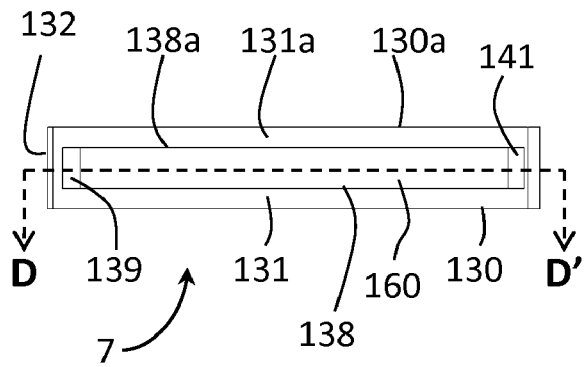
FIG. 24
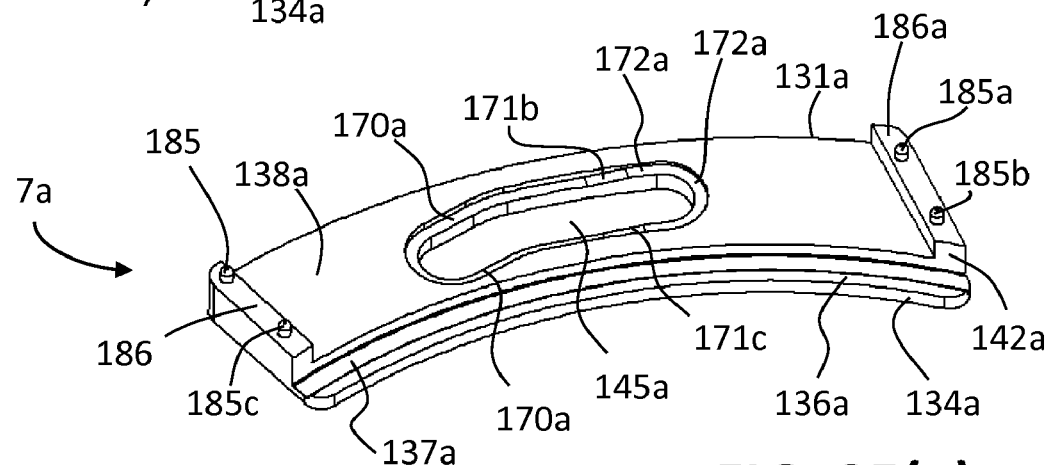
FIG. 25(a)
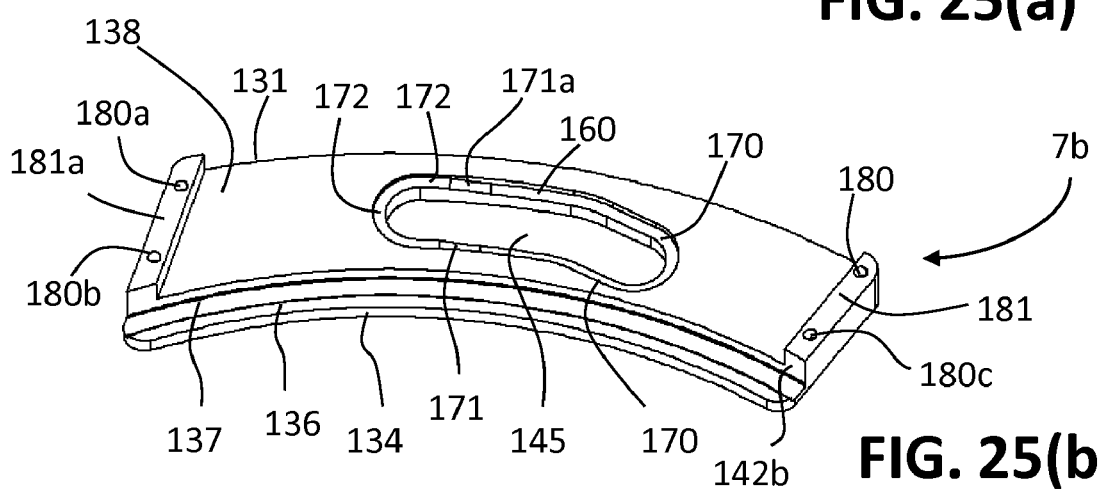
FIG. 25(b)

MULTIFUNCTIONAL RULER AND PROTRACTOR SET WITH ABILITY TO FORM AND SCALE A NEAR INFINITE NUMBER OF GEOMETRIC SHAPES

BACKGROUND OF THE INVENTION

The present invention relates to sketching and measuring tools, rulers, protractors, devices for creating geometric shapes, and combinations thereof.

Many mechanical devices have been proposed and/or used for measuring and sketching straight lines, angles, and combinations of the same. The most common of these are straight rulers, stacked rulers with a fixed pivot, t-squares, adjustable t-squares, protractors, protractors with indicating arms, triangle rulers, squares rulers, adjustable fixed-length triangles with limited angle variability, and fixed-angle devices, such as scalable squares and frames.

However, most, if not all of these devices have limited intended uses: e.g., typical standalone rulers and T-squares are only useful in sketching and measuring straight lines; standalone protractors typically only allow for angle measurement and do not facilitate sketching; stacked rulers with a fixed pivot only allow for angle creation where at the location on the ruler where the fixed pivot point is located; fixed-length and variable-angle triangular sketch and measure devices can only be used over a small range of angles; scalable squares and frames have fixed angles and thus, are not useful for creating and scaling other shapes, etc.

More recently, combinations of rulers and protractors have appeared in the art, but these devices have limited intended uses, too. An example is the stacked, two-ruler configuration (U.S. Pat. No. 7,082,692 B2) with a sliding pivot element that fastens the two rulers of this assembly together and that is centralized in a slot that is common to the each of the stacked rulers; this configuration allows for an angle to be created at any metric point along the edge of each ruler where the rulers' edges intersect each other. However, if an angle is created at a certain metric, e.g., the 5 inch mark, and the angle is subsequently changed, this change causes the point of intersection (vertex of the angle) between the two rulers to move along the metered edges of each ruler; i.e., the vertex of the angle moves away from the 5 inch mark.

A second issue with this type of design is that the two rulers with the pivot element are fixed to each other either permanently or semi-permanently, and these modes of attachment do facilitate rapid interchangeability between rulers (no quick connect/disconnect mechanism) or the addition of multiple rulers to create a super-assembly and thus, multi-sided shapes. Third, this stacked configuration causes each ruler to be raised off the sketching or measuring surface by a different height, which makes sketching and measuring along a stacked ruler's edge both inaccurate and difficult.

Perhaps, the most versatile of these devices that appears in the art is a ruler system composed of a central protractor piece that is permanently fastened to two rulers both of which emanate from the central protractor piece (U.S. Pat. No. 5,732,474). In this design, rulers act as legs and are allowed to rotate independently of each other: one ruler is hollow and acts as a sleeve; the other ruler is solid and acts as a male mating piece. This configuration allows for the male leg or insert of a second, same device to be inserted into the female leg or sleeve of a first device, and vice versa, thereby allowing for numerous shapes and mating configurations to be formed.

However, like the aforementioned devices, this device, too, has design issues that limit its intended uses. First, the length of the longest leg, regardless of whether the longest leg is the male or female mating member, is minimum separation distance that can be achieved between protractors when the male leg from one device is inserted into a female leg of another device. Second, the largest separation achievable between protractors must be less than the sum of the male and female legs added linearly, since the male leg must have, at least, some small amount of material inserted into the female leg in order to hold the configuration of parts together. Both of these facts attest to the limited scalability of this design. Third, the sleeve design itself creates a width-wise step along the edges of the mated rulers, which obscures both the sketching and measuring of straight lines. Further, this same mating design also creates an issue of overlapping ruler markings, where the marking on the male leg (insert) become either hidden or obscured by the markings on the female leg (sleeve), depending or a whether an opaque or transparent material, respectively, is used to construct these devices. Additionally, it is inevitable that the marking on the female and male legs must move past each other in opposite directions, regardless of the desired configuration; this creates a confusing situation when one attempts to make a linear measurement with any mated portions of a multi-device assembly of this type, since there is no significant meaning between distance of the measurement marking on oppositely moving and mated legs of different devices. As claimed in (U.S. Pat. No. 5,732,474), this device was only intended to be a visual aid, and it is mostly because of the said limitations.

Accordingly, there is a need for a design that resolves the deficiencies in the aforesaid devices and one that introduces a set capabilities not yet seen in the prior art.

SUMMARY OF THE INVENTION

A multifunctional ruler and protractor tool with the ability to form and scale a near infinite number of geometric shapes is provided. The tool comprises both a standalone ruler and a protractor unit. The ruler may have both empirical and metric markings, and multiple rulers may be capable of being added to each other, end to end, in succession, creating a straight ruler assembly of virtually any length. The protractor unit can be slid onto a single ruler or a straight ruler assembly containing any number of consecutively connected rulers, and is capable of fastening another ruler to the sides of the protractor unit by a quick connect/disconnect mechanism. Preferably but not necessarily, all rulers units coupled to the protractor unit lie in the same plane.

The protractor unit according to one embodiment comprises an assembly block, a translation block, the protractor component, and a sliding lock. The assembly block holds all of the components of the protractor unit together, and contains features that allow each component of the protractor unit to perform its intended function. The protractor component of the protractor unit pivots therein or therewith, allowing for the creation of angles between rulers that are fastened to the protractor component. The translation block arrests rotational motion of the protractor component when the sliding lock is manipulated to either lock rotation or both rotation and translation. The sliding lock can arrest translational motion of the protractor unit along any ruler, if it is manipulated to do so.

Multiple rulers and protractors can be connected to form both open and closed, regular and irregular, polygons, and other sided geometric shapes. Geometric configurations can be scaled to larger or smaller sizes by locking rotational motion of each protractor unit and adjusting the lengthwise position of protractor units along rulers. When a geometric configuration of ruler and protractor units is created using either empirical or metric distance measurements, the entire assembly can be flipped over to read the marking in the complimentary system.

BRIEF DESCRIPTION OF THE DRAWING

FIG. 4(a) is a magnified, front view of the ruler shown in FIG. 2.

FIG. 4(b) is a magnified, top view of the front of the ruler shown in FIG. 2.

FIG. 4(c) is a magnified, top view of the back of the ruler shown in FIG. 2.

FIG. 4(d) is a magnified, back view of the ruler shown in FIG. 2.

FIG. 7(a) is a magnified, top view of the two-ruler assembly shown in FIG. 6(a) showing the fastening mechanism.

FIG. 7(b) is a magnified, top view of the two-ruler assembly shown in FIG. 6(a) with the two rulers disassembled and fastening mechanism exposed.

FIG. 13 is an isometric view of the protractor component, a component of the protractor unit, shown in FIG. 8.

FIG. 14 is a bottom view of the protractor component shown in FIG. 13.

FIG. 15(a) is right view of the protractor component shown in FIG. 14.

FIG. 23 is a bottom view of sliding lock shown in FIG. 22.

FIG. 24 is a back view of sliding lock shown in FIG. 22.

FIG. 25(a) is an isometric view of the bottom sub-component of the sliding lock shown in FIG. 22.

FIG. 25(b) is an isometric view of the top sub-component of the sliding lock shown in FIG. 22.

DETAILED DESCRIPTION OF THE PREFERRED EMBODIMENTS

Figure 1A:
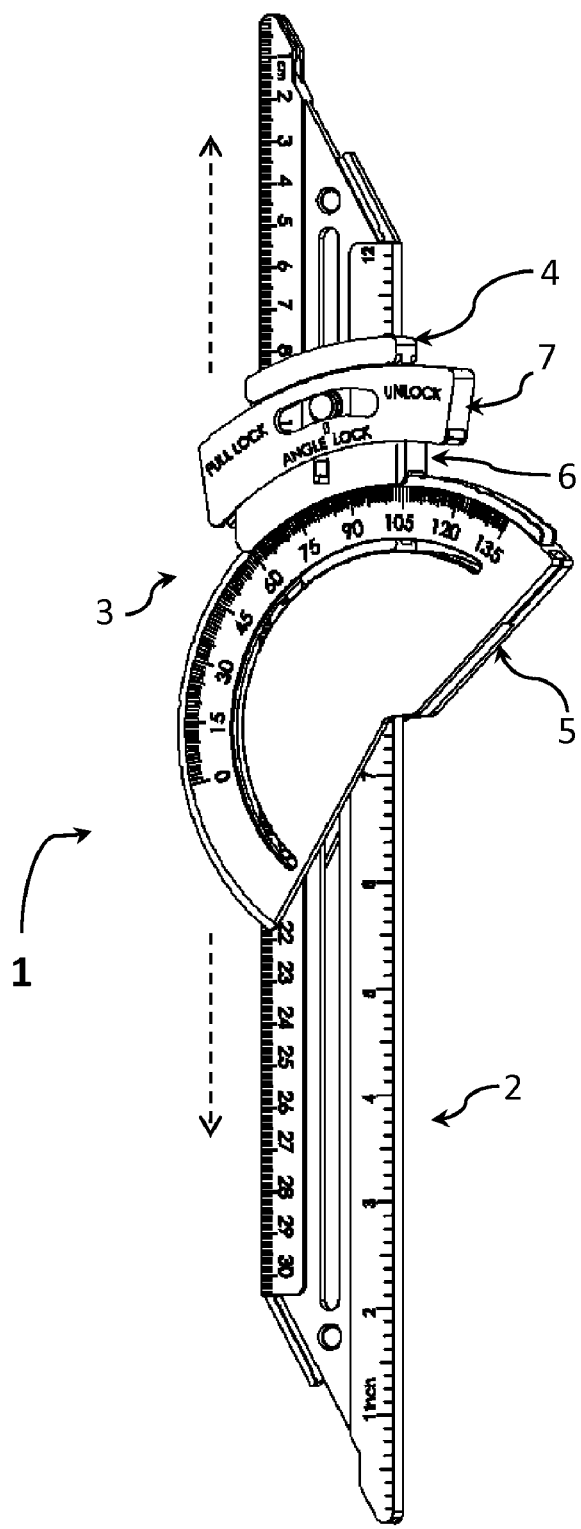
FIG. 1(a) is a top view of the most basic assembly of the preferred embodiment of the multifunctional ruler and protractor set according to at least one embodiment of the invention, where a protractor unit is slidably engaged to a ruler.

Generally referring to FIGS. 1(a)-2 and FIG. 8, the tool 1 is provided herewith that comprises two main, standalone components: the ruler unit 2 and protractor unit 3. Preferably, the ruler 2 is an indivisible part, and the protractor unit 3 is itself an assembly comprising the following components: an assembly block 4, a protractor unit 5, a translation block 6, and a sliding lock 7. Together and in pluralities, the ruler 2 and the protractor unit 3 can be used to construct a myriad of different geometric and polygonal configurations (FIGS. 26(a)-26(b), 29(a)-33(b)).

The ruler 2, 2', as shown FIGS. 1(a)-7(b) and 26(a)-28(c), has a long body that in at least one embodiment is a quadrilateral solid in shape and is generally straight with a select length, width, thickness, and cross-sectional dimensions. The ruler 2, 2' comprises one or more of the following major features: minor surfaces 10, 10a, 10b, 10c, 10' and 10b'; center slot 9 and 9'; attachment holes 14, 14a, and 14'; center tracks, 8, 8a, and 8'; and material ends 13, 13a, and 13' with male 11, 11a, 11' and female fastening features 12, 12a, 12'.

Figure 2:
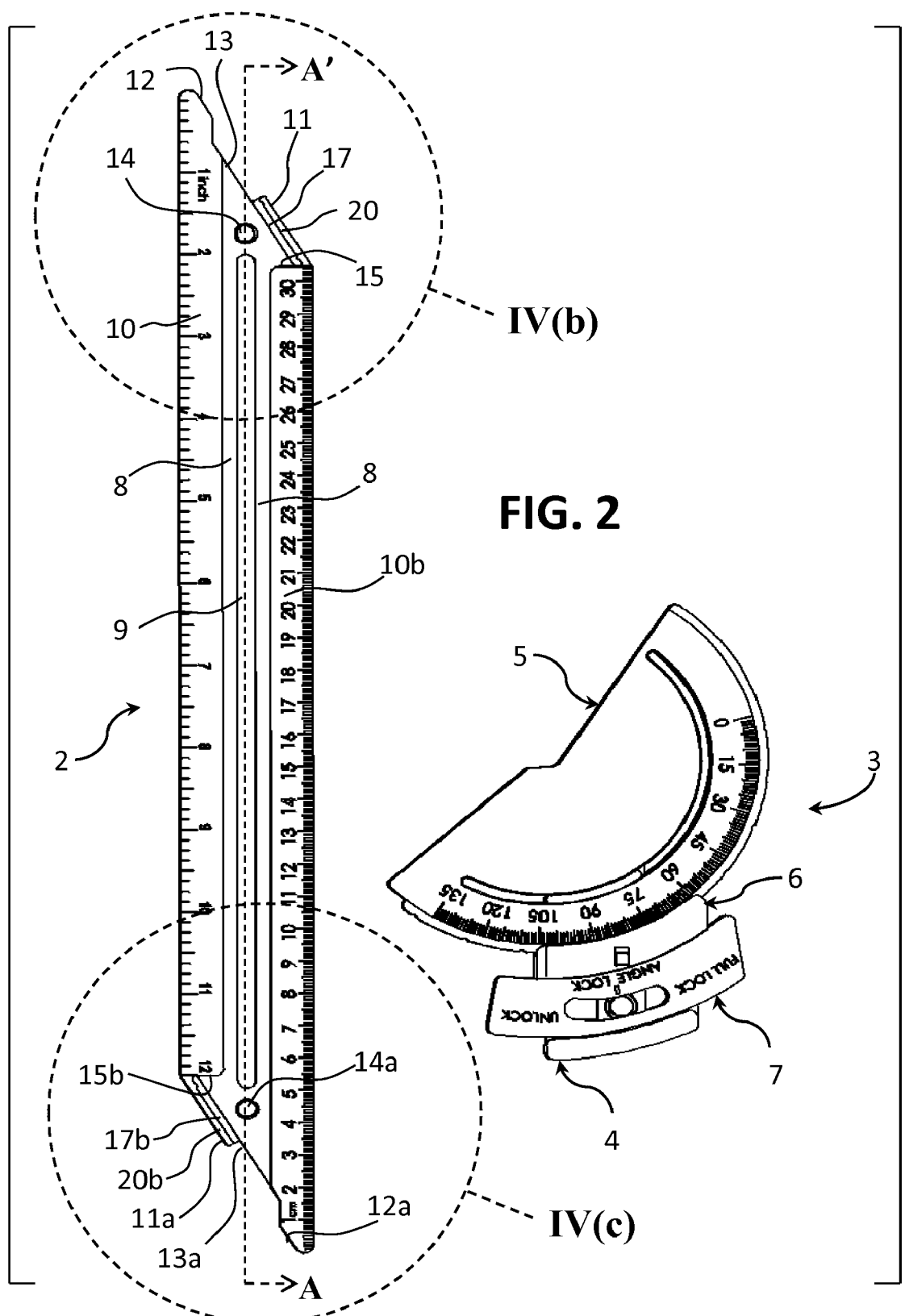
FIG. 2 is a top view of the tool shown in FIG. 1(a) with the protractor unit disassembled from the ruler.
Figure 3A:
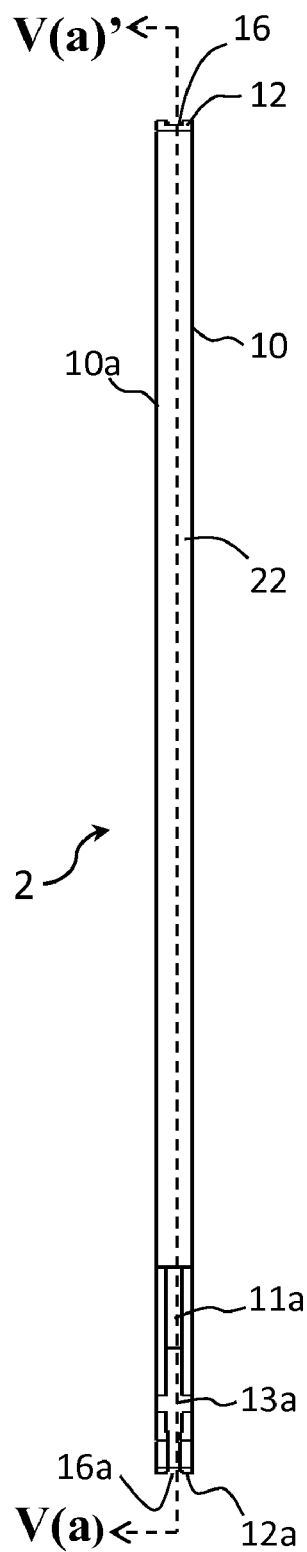
FIG. 3(a) is a left view of the ruler shown in FIGS. 1(a) through 2.
Figure 3B:
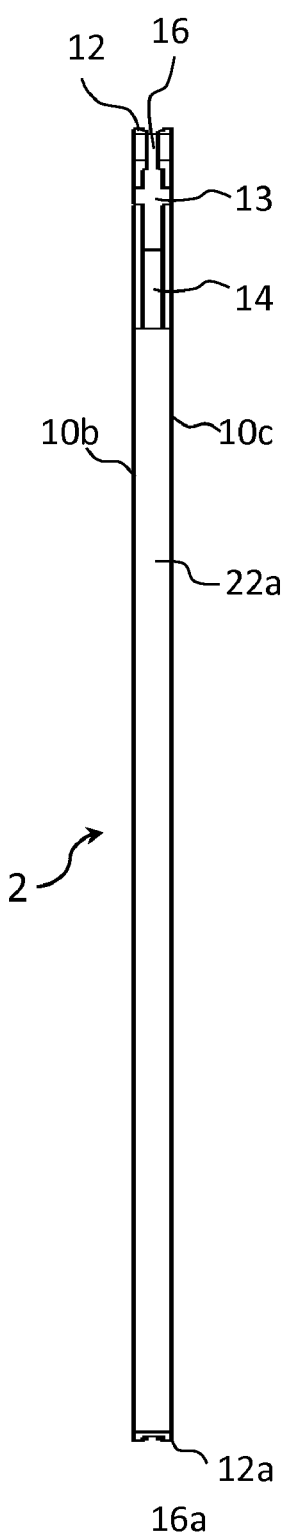
FIG. 3(b) is a right view of the ruler shown in FIGS. 1(a) through 2.
Figure 3C:
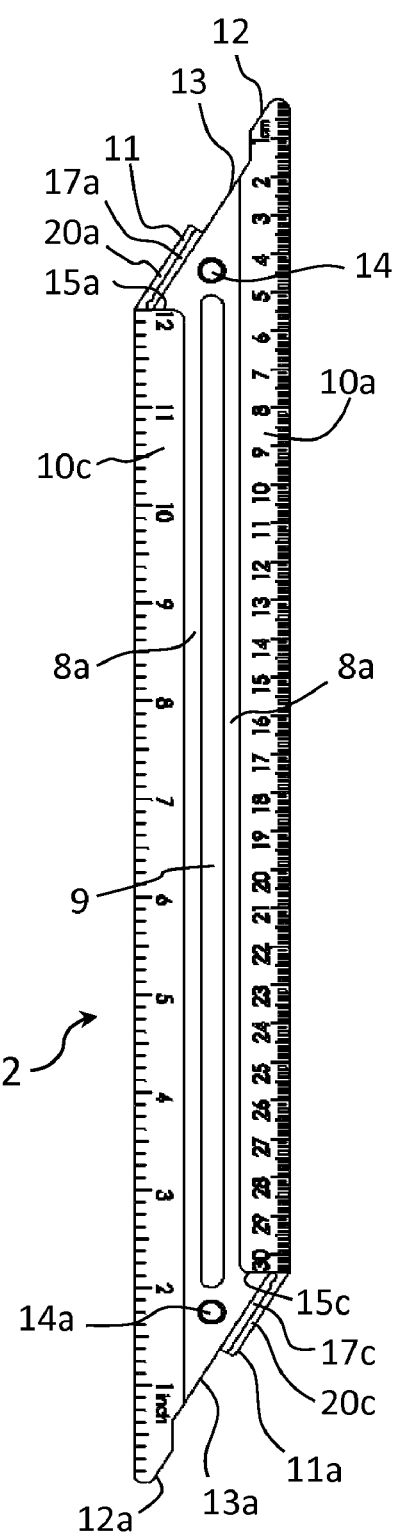
FIG. 3(c) is a bottom view of the ruler shown in FIGS. 1(a) through 2.

Additionally, rulers 2, 2' may have two minor surfaces 10 & 10a, 10b & 10c, 10' & 10b' on each top and bottom surface of the ruler 2. Opposing surfaces 20 & 20a, 10 & 10a, 10b & 10c, 10' & 10b' are preferably parallel, except for the rotationally symmetrical ends 13, 13a as described herein. Also, the ruler 2, 2' itself, may include at its ends 13, 13a and both the male 11, 11a, 11' and female fastening elements 12, 12a, 12' and all other features, may also be rotationally symmetric about the plane A-A' as shown in FIG. 2 and may be regularly symmetrical about the plane V(a)-V(a)' as shown in FIG. 3(a).

Each minor surface 10, 10a, 10b, 10c, 10', 10b', as shown in FIG. 1(a) through 7(b), has measurement markings near the ruler's edges 22, 22a, 22', 22a' that can be of any unit measurement system (e.g., empirical, metric, etc.), mixture of systems, patterns of different unit scales, or markings indicating proportions (e.g., golden ratio); preferably, these markings ascend in order from the tip of the female fastening element 12, 12a, 12 to the should 15, 15a, 15b, 15c, 15' on the opposite end of the ruler 2, 2'.

Referring to FIGS. 1(a) through 5(c), the measurement markings on each minor surfaces 10, 10a, 10b, 10c, 10', 10b' that are on the same either top or bottom surface of the ruler 2, 2' can be of different unit measurement systems; e.g., one can be in metric units, such as millimeters or centimeters, and the other in empirical units, such as inches. In general, when measuring marking on a ruler 2, 2' are of different unit measurement systems, opposing minor surfaces 10, 10a, 10b, 10c, 10', 10b' along the same edge 22, 22a, 22', 22a' of a ruler 2, 2' have measurement marking that are in the complimentary unit measurement system with respect to each other; e.g., if measurement markings on a top surface minor surface 10 along a side edge 22 are in millimeters (metric system), then measurement markings on the opposing surface 10a along the same edge 22 should be in inches (empirical system).

In one embodiment, center tracks 8, 8a, and 8' on the ruler 2, 2', as shown in FIGS. 1(a) through 4(c), consist of recessed surfaces and side walls that are nearly as long as the ruler's itself; these tracks 8, 8a, and 8' have a select width and depth and are intended facilitate and cooperate with the movement of the assembly block's 4 center bodies 26, 26(a) when the protractor unit 3 is slidably engaged to a ruler(s) 2, 2'.

Additionally, the recessed surfaces on the tracks 8, 8a(FIGS. 1(a)-4(c)) may also take part in the friction locking mechanism that is responsible for locking the sliding motion of a protractor unit 3 along a ruler's 2, 2' length, assuming that a protractor unit 3 is slidably engaged to a ruler 2, 2': when the sliding lock 7 is manipulated to the full lock position 147 as described below (FIGS. 28(a) through 28(c)), the underside surfaces 42 and 42a on center bodies 26 and 26a of the assembly block 4 (FIGS. 9-12) press against the recessed surfaces of the center tracks 8, 8a, and 8' and thereby, creating friction a force that arrests the translational or sliding movement of the protractor unit 3 (FIG. 1(a)). The tracks 8, 8a may extend the entire length of the ruler 2, 2' so that, when multiple rulers are attached to each other end to end, the protractor unit 3 may slide lengthwise from one to another of the rulers and may be locked at any point on the combined ruler set.

Referring to FIGS. 1(a) through 5(c), center slot 9, 9' is a lengthwise slot that is preferably centered both widthwise and lengthwise on the ruler 2, 2'. The attachment holes 14, 14a, 14' may be holes that are centered on the ruler's 2, 2' triangular ends 13, 13a, 13'. The center slot 9, 9' and attachment holes 14, 14a, 14' may be extend entirely and/or part way through the thickness of the ruler 2, 2'. The center slot 9, 9' and attachment holes 14, 14a, 14' are intended to provide attachment points for accessories, and are optional. Further, if present, these holes 14, 14a, 14' and slots 9, 9' may be of any cross-sectional dimensions as long as they do obstruct, but rather cooperate with intended functions, movement, and dimensions of all other features and sub-features of the ruler 2, 2' itself and that of all other assemblies 3 and components 4, 5, 6, 7 of those assemblies 3 when a protractor unit 3 is slidably engaged to a ruler 2, 2' or both slidably engaged and laterally fastened to rulers as shown in FIG. 26(a)-27(c).

Figure 26A:
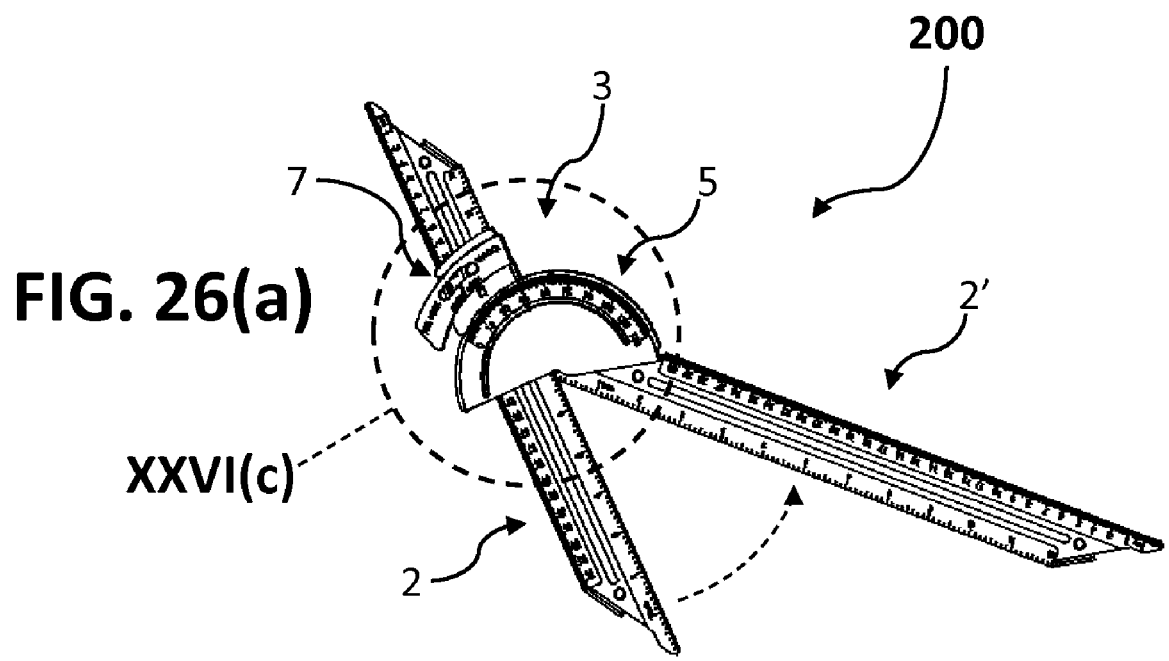
FIGS. 26(a) through 26(b) is a top view of at least one embodiment of at least one embodiment of the invention as a two-ruler assembly, showing how two rulers can be both slidably engaged and laterally fastened to a protractor unit and how different angles can be created between these rulers.
Figure 26B:
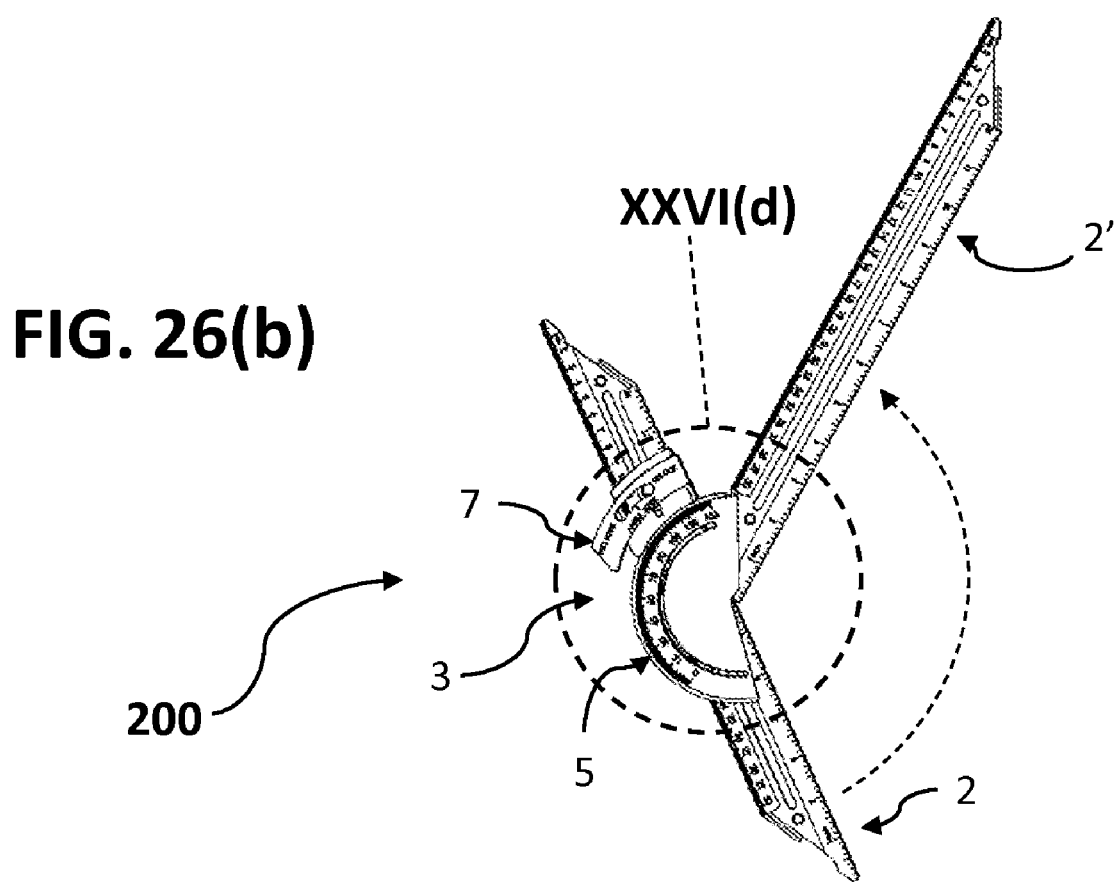

Referring to FIGS. 2 through 7(b), the ends 13, 13a, 13' of the ruler 2, 2' are preferably straight, oriented diagonally relative to the lengthwise axis of the ruler 2, 2' thereby giving the ends a triangular shape, but can also be of any shape as long as the shape allows the ruler 2, 2' (i) to both laterally fasten at the ends to other rules and to slidably engage protractor units 3 as discussed herein and/or (ii) to cooperate with functions, movement, and dimensions of all other features and sub-features on the ruler 2, 2' itself, and that of all other assemblies 3, 100 (FIGS. 26(a)-26(b)) and components 2, 2', 4, 5, 6, 7 of those assemblies 3, 100, as well as with creation of other geometric assembly configurations (FIGS. 29(a)-33(b)) as described herein.

Additionally, the ruler's ends 13, 13a, 13', as shown in FIGS. 2 through 7(b), have male 11, 11a, 11' and female fastening elements 12, 12a, 12' that facilitate connecting, locking, and disconnecting of a ruler 2, 2' to and from the protractor component 5 of the protractor unit(s) 3 and/or to and from other rulers 2, 2'. The male fastening elements 11, 11a, and 11' and female elements 12, 12a, and 12', preferably, are both located on each of the ruler's 2, 2' ends 13, 13a, 13' and are separated from each other along the ends 13, 13a, 13' by a space that is able to accommodate the full length of either fastening element 11, 11a, 11', 12, 12a, 12'. These fastening elements 11, 11a, 11',12, 12a, and 12' have a select width, thickness, length, and cross-sectional dimensions and have a shape that is preferably rectangular and parallel to the diagonal profile of the ruler's ends 13, 13a, 13'; however, the shape of these fastening elements 11, 11a, 11',12, 12a, and 12' can also be of any shape as long as the shape facilitates and cooperates with action and mechanism of fastening rulers 2, 2' to other rulers 2, 2' and to the protractor component 5 of protractor units 3.

Male fastening elements 11, 11a, and 11' on the ruler's ends 13, 13a, 13', as shown in FIGS. 2-7(b), consist of a locking elements 20, 20a, 20b, 20c, and 20' and tracks 17, 17a, 17b, 17c, and 17' that in at least one embodiment are all generally rectangular in shape and that have a select width, thickness, length, and cross-sectional dimensions that facilitate and cooperate with both the sliding and locking of the locking elements 20, 20a, 20b, 20c, and 20' onto the tracks 16 and 16a of the female fastening elements 12, 12a, and 12' of other rulers 2, 2' when a ruler 2, 2' is fastened to another ruler 2, 2'.

Female snap features 19, 19a, 19b, 19c, and 19', as shown in FIGS. 4(b) through 7(b), are located on the inside wall of the locking elements 20, 20a, 20b, 20c, and 20' along the track 17, 17a, 17b, 17c, and 17' are intended to facilitate locking to the male snap feature 80 on the protractor component 5 after a male fastening element 11, 11a, and 11' on the ruler 2, 2' has been inserted into the track 81 on the protractor component 5 for the purpose of fastening a ruler 2, 2' onto a protractor unit 3.

The snap features 18, 18a, 18b, and 18' (FIGS. 4(a) through 7(b)) on the inside wall of the locking element 20, 20a, 20b, 20c, and 20' along the track 17, 17a, 17b, 17c, and 17 are intended to facilitate locking to the snap features 25, 25a, 25b, and 25c on the female fastening element 12, 12a, 12' after a male fastening element 11, 11a, 11' has been inserted into the track 16, 16a of the female fastening element 12, 12a, 12' for the purpose of fastening rulers 2, 2' consecutively to each other.

Figure 5A:
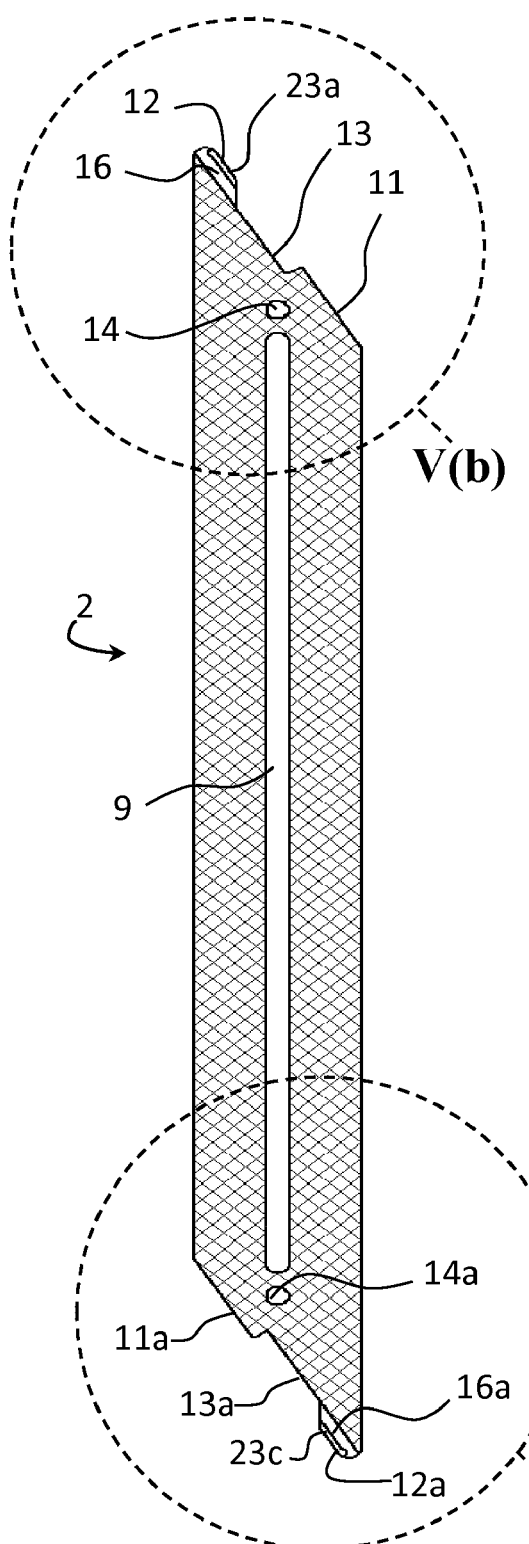
FIG. 5(a) is a cross-sectional view of the ruler taken from the cutting plane V(a)-V(a)' as shown in FIG. 3(a).
Figure 5B:
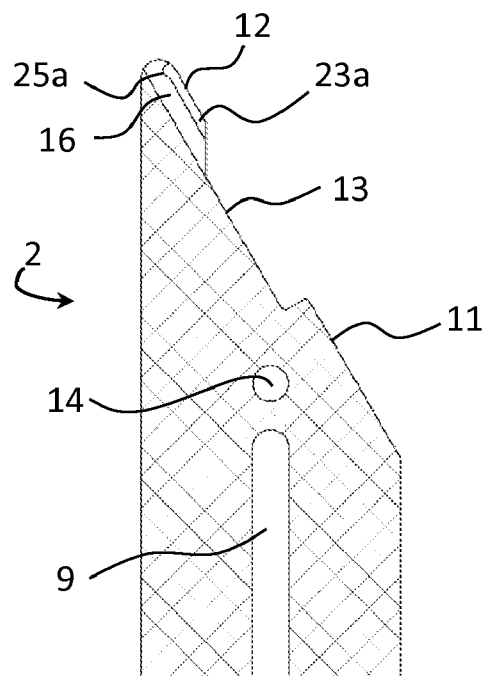
FIG. 5(b) is a magnified, top view of the front part of ruler shown in FIG. 5(a).
Figure 5C:
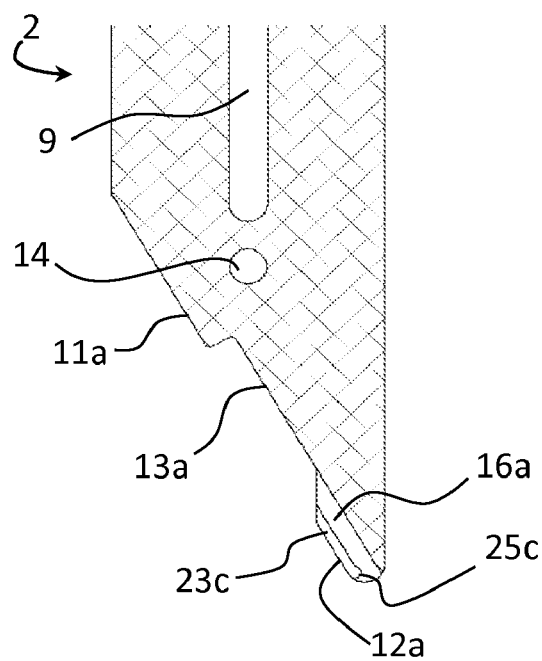
FIG. 5(c) is a magnified, top view of the back part of ruler shown in FIG. 5(a).
Figure 6A:
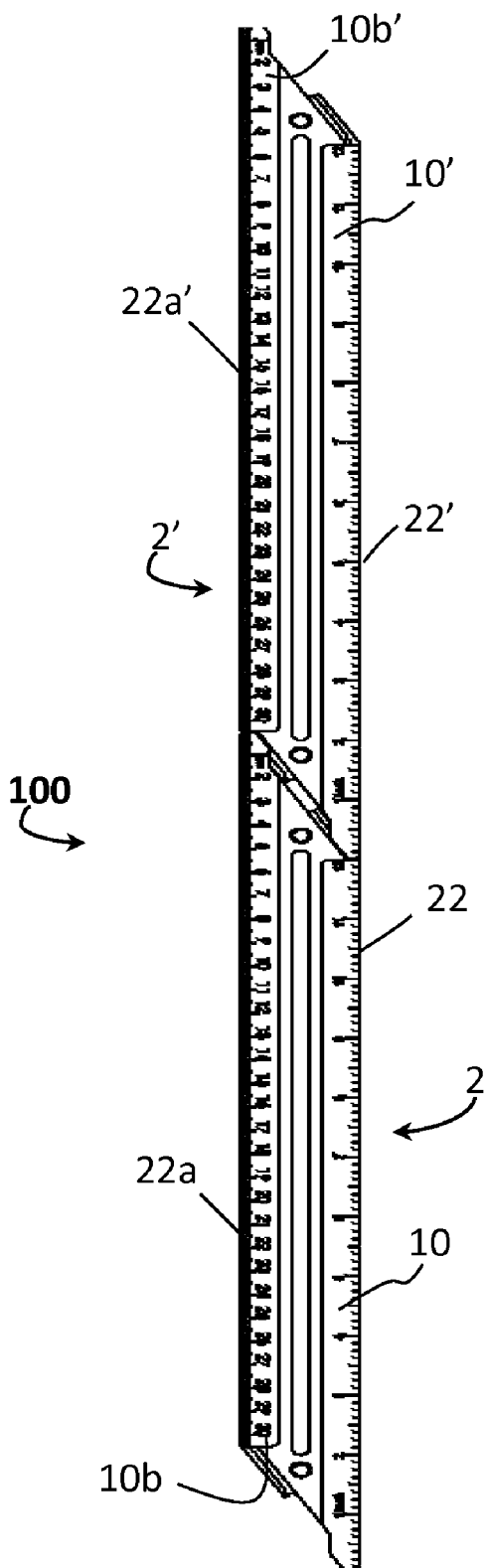
FIG. 6(a) is top view of a two-ruler assembly, where the rulers are fastened to each other, consecutively.
Figure 6B:
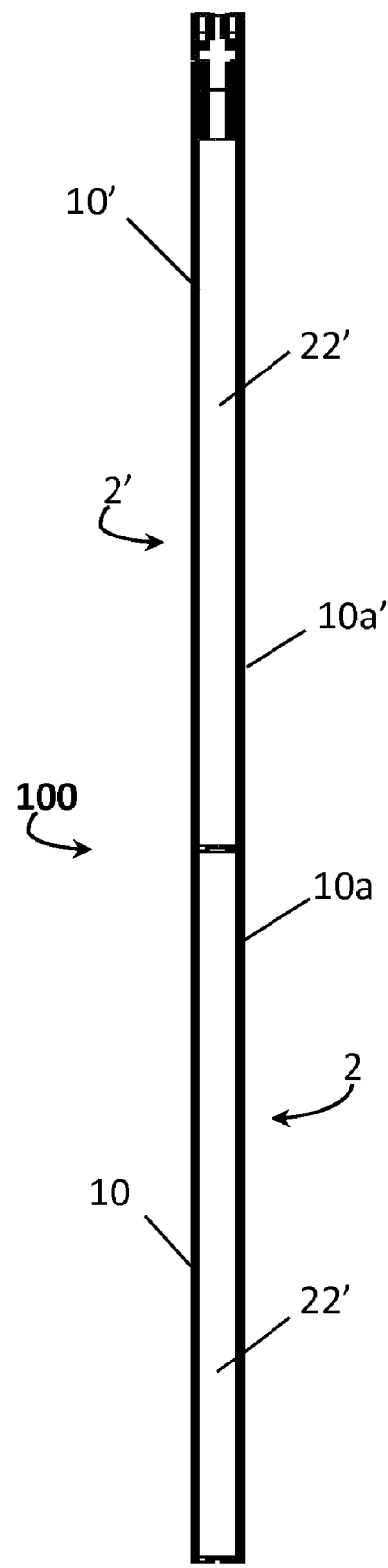
FIG. 6(b) is left view of the two-ruler assembly shown in FIG. 6(a).
Figure 8:
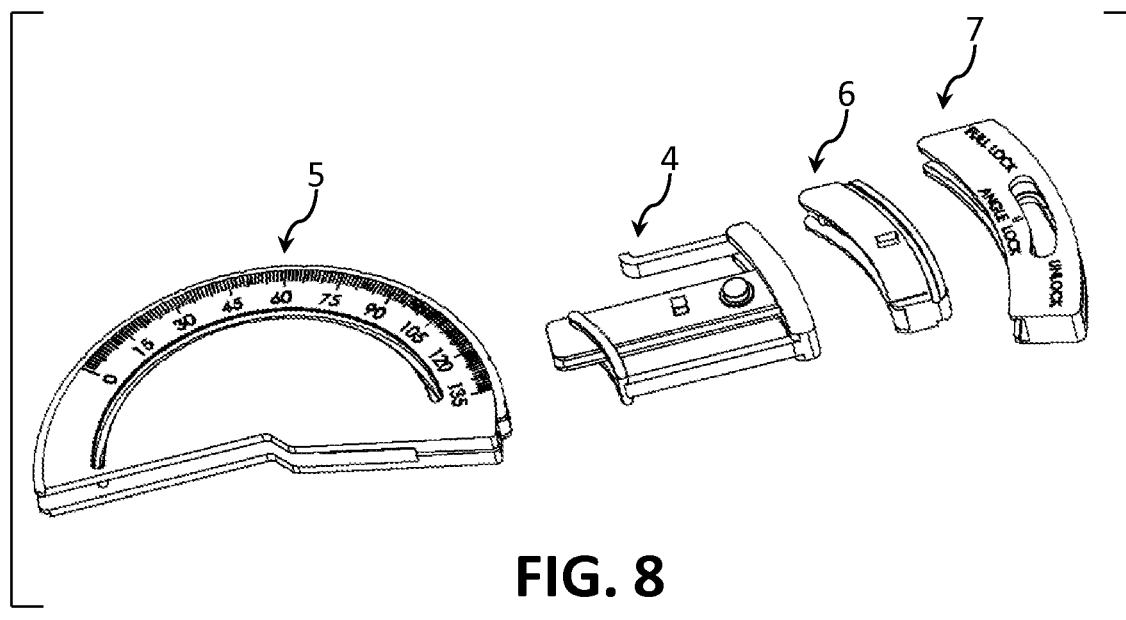
FIG. 8 is an exploded view of the protractor unit shown in FIGS. 1(a) and 2, exposing its components.

Female fastening elements 12, 12a, and 12' on the ruler's ends 13, 13a, and 13' (FIGS. 2- 7(b)) consist of a inner track 16, 16a, locking elements 23, 23a, 23b, 23c, and a slot 24, 24a, as shown FIGS. 5(b)-5(c), all of which are preferably rectangular in shape, parallel to the profile of the ruler's 2, 2' ends 13, 13a, 13' and have a select depth, width, length, and cross-sectional dimensions that are to facilitate and cooperate with both the sliding and locking of locking element pairs 20 & 20a, 20b & 20c onto the tracks 16 and 16a of male fastening elements 12, 12a, 12' of other rulers 2, 2' when rulers 2, 2' are being fastened to each other 2, 2'.

Snap features 25, 25a, 25b, and 25c (FIGS. 4(a) through 7(b)) on the locking elements 23, 23a, 23b, and 23c of the female fastening elements 12, 12a, and 12' are intended to facilitate locking to the snap features 18, 18a, 18b, and 18' on the male fastening elements 11, 11a, and 11' after a male fastening element 11, 11a, 11' on the ruler has been inserted into the track 16, 16a on the female fastening element 12, 12a, 12' for the purpose of fastening rulers 2, 2' to each other, consecutively.

Referring to FIGS. 5(a) through 7(b), to fasten a ruler 2, 2' to another ruler 2, 2' or to consecutively-connected ruler assemblies 100, slide one set of the male locking elements 20, 20a, 20b, 20c, 20', which are located on either end 13, 13a, 13' of any ruler 2, 2' into the track 16, 16a of the female fastening element 12, 12a, 12' of another ruler 2, 2', or vice versa, until the pertinent snap feature 18, 18a, 18b, 18c, 18' of the male fastening elements 11, 11a, 11' on one of rulers 2, 2' fully engages the pertinent snap feature 25, 25a, 25b, 25c of the female fastening element 12, 12a, 12' on the other or another ruler 2, 2'. Many rulers 2, 2' can be connected in this same manner (e.g., six, ten, twenty, or thirty individual rulers can be connected end-to-end) for the purpose of creating long straight-edged assemblies.

To unfasten a ruler 2, 2' from other rulers 2, 2' or consecutively-connected ruler assemblies 100 (FIGS. 5(a)-(b)), pull rulers 2, 2' diagonally away from each other in the direction of the length of the locking elements 20, 20a, 20b, 20c, 20' until the snap feature(s) 18, 18a, 18b, 18c, 18' of the male fastening elements 11, 11a, 11' on one ruler 2, 2' disengage the snap features 25, 25a, 25b, 25c of the female fastening element 12, 12a, 12' on the other ruler 2, 2' and until rulers 2, 2' are completely spatially separated from each other as shown in FIG. 7(b).

For consecutive-ruler assemblies 100, as shown in FIGS. 7(a) through 7(b), where rulers 2, 2' are fastened to each other, the tips of the female fastening elements 12, 12a, 12' of one ruler 2, 2' should contact or be in proximity to the pertinent set of shoulders 15, 15a, 15b, 15c, 15' that are on the mating end 13, 13a, 13' of the other ruler 2, 2' as shown in FIG. 7(a).

Additionally, when multiple rulers 2, 2' are connected consecutively to each other to make larger linear ruler assemblies 100 (FIG. 7(a)-7(b))—all top, bottom, and side surfaces of individual rulers 2, 2' should closely align, lie in the same plane, or be tangent to each other at their mating junction or contact points, as this will ensure that measurement markings on the minor surfaces 10, 10a, 10b, 10c, 10', and 10b' (FIGS. 2-7(b)) of one ruler 2' add directly to the measurement markings on the other ruler(s) 2, and that this addition, preferably, occurs in the same ascending or descending order as the measurement markings on the first ruler 2 or consecutive ruler assembly(s) 100. Also, it is preferably that measurement markings on contiguous minor surfaces 10 & 10', 10b & 10b' in a consecutive-ruler assembly(s) 100 be of same unit measurement system (e.g., metric and metric).

Generally referring to FIGS. 1-2, 6(a)-8, and 26(a)-28(c), the protractor unit 3 as previously stated, is an assembly composed of assembly block 4, protractor 5, translation block 6, and sliding lock 7 components and is itself a standalone device that can be managed and handled independently of a ruler(s) 2, 2'. However, the protractor unit 3 can also be removably attached to the rulers so that the protractor unit 3 slidably engages rulers 2, 2' and consecutive ruler assemblies 100, and other rulers 2, 2' and consecutive ruler assemblies 100 can be laterally fastened to the protractor unit's protractor component 5 (FIGS. 26(a)-27(c), 8, & 13-16(b)), as described herein.

Referring to FIGS. 1-2 and 8-12, in at least one embodiment the assembly block 4, is the central component of the protractor unit 3; all other components 5, 6, 7 of the protractor unit 3 in this instance are assemble onto the assembly block component 4 in order to fully compose a protractor unit 3. The assembly block component 4 is preferably fixed relative to the other components 5, 6, and 7 of the protractor unit 3 when the components 4, 5, 6 and 7 are in the assembled state, while the other components 5, 6, and 7 are free to move in the manner and under the conditions described herein. Cooperation between the components 4, 5, 6, and 7 of the protractor unit 3 allows components 4, 5, 6, 7, and the protractor unit 3 to function as intended and described herein.

The assembly block 4, as shown in FIGS. 9 through 12 is composed of a body that has a main block 56 and the following major features, all of which extend from the main block 56 and have select length, width, thickness, and cross-sectional dimensions: center bodies 26 and 26a and side bodies 29 and 30. Additionally, the main block 56, the said features 26, 26a, 29 and 30 and all sub-features of the assembly block 4 are symmetrical about the plane B-B' (FIG. 11) and accommodate and cooperate with the assembly of components 5, 6, and 7 (FIGS. 1-2 & 8) onto the assembly block 4 itself, as described herein.

The main block 56 (FIGS. 9-12) has an external shape that is generally rectangular, but that can also be of various shapes as long as the shape accommodates the internal cross-sectional shape and dimensions 46 of the assembly block 4. It is preferred that the surfaces 28 and 28*a* be aligned with or be in proximity to the surfaces 60 and 60*a* of the protractor component 5 (FIGS. 13-16(*b*)) when the components 4, 5, 6, and 7 (FIGS. 1-2 & 8) are in an assembled state 3. The main block 56 is intended to impart mechanical stability to the center bodies 26 and 26*a* and side bodies 29 and 30 and to serve as a finger grip to facilitate handling of the protractor unit 3 as a whole, since assembly block 4 is intended to remain relatively fixed with respect to the pivoting aspect of the protractor unit 3 as compared to the rest of the components 5, 6, 7 in the protractor unit 3.

The outer surface 50 (FIGS. 9-12) of the assembly block 4 is preferably chamfered along the internal cross-section 46 in order to facilitate sliding onto to a ruler(s) 2, 2' when the components 4, 5, 6, and 7 are in the assembled state 3. The inner surfaces 59 and 59*a* are intended to be concentric with the outer surface 131 and 131*a* of the sliding lock 7 (FIGS. 22-25(*b*)) and should also provide enough clearance as to not obstruct the sliding lock's 7 lateral and rotational movement, which allows sliding lock 7 to slide to a lock or unlock position (FIGS. 28(*a*)-28(*c*)), when components 4, 5, 6, and 7 are in the assembled state 3, regardless of whether the protractor unit 3 is mated to a ruler(s) 2, 2'.

Side body 30 (FIGS. 9-12) is a body that extends from the main block 56 and is connected only to the main block 56. Side body feature 30 is optional and a redundancy; its main purpose is to hold feature 31 in its intended spatial position as described below. Feature 31 of the side body 30 is a piece of material that curves off of the side body 30 and is intended to mate with feature 92 of translation block 6 (FIGS. 17-21(*b*)) when the components 4, 5, 6, and 7 are in the assembled state 3; feature 31 is also a redundancy that is intended to prevent lateral and rotational movement of the translation block 6 in the event that the guiding elements 35, 35*a* undergo material failure and are unable to properly mate and cooperate with the guiding elements 86, 86*a* (FIGS. 17-21(*b*)) of the translation block 6 when the components 4, 5, 6, and 7 are in the assembled state 3 and the sliding protractor component 3 is being handled independently of a ruler 2, 2'.

Side body 29 also extends outward from the main block 56 and is connected to both the main block 56 and the curved fastening elements 27 and 27*a*. Side body 29 in cooperation with the curved fastening elements 27 and 27*a* imparts mechanical rigidity to center bodies 26, 26*a*, especially by preventing center bodies 26, 26*a* from collapsing medially towards the center plane B-B (FIG. 11) when the components 4, 5, 6, and 7 are in the assembled state 3 and the protractor unit(s) 3 is being handled independently from a ruler 2, 2', or an assembly of rulers 100 (FIG. 6*a*-6*b*), an example of which can be seen in FIG. 2.

Figure 9:
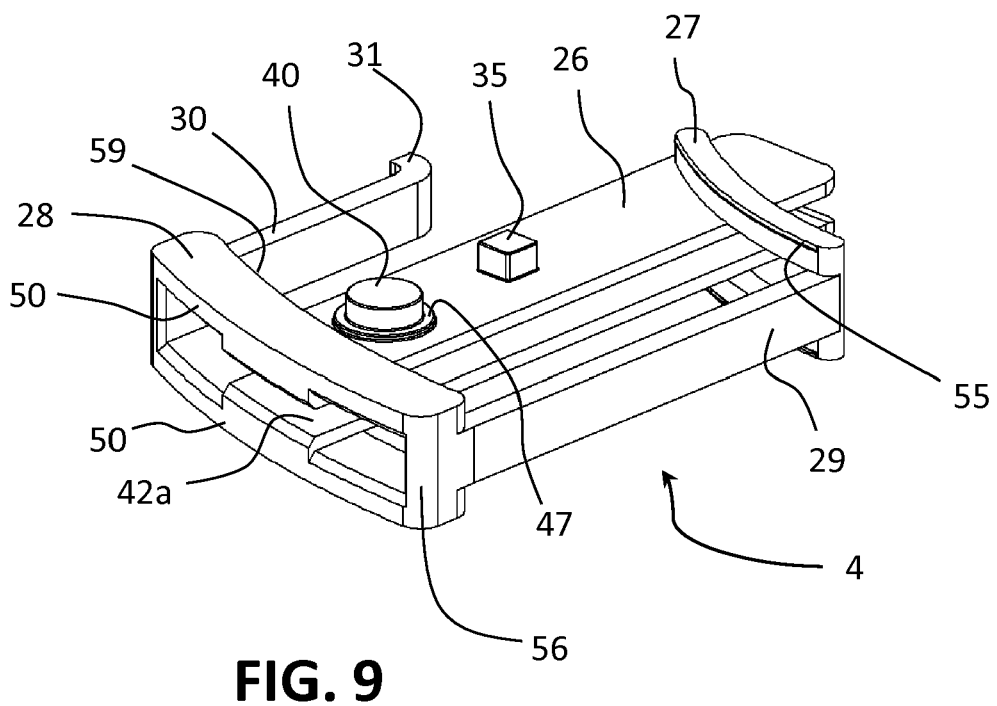
FIG. 9 is an isometric view of the assembly block, a component of the protractor unit, shown in FIG. 8.

Additionally, the inner walls of the side bodies 29 and 30 (FIGS. 9-12) are intended to contact or be in proximity to the side walls 22, 22*a*, 22' and 22'*a* of the ruler 2, 2' (FIGS. 2-6(*b*)) when the components 4, 5, 6, and 7 are in an assembled state 3 and the protractor unit 3 is slidably engaged to a ruler 2, 2', for example, when the ruler 2, 2' is placed within the channel that extends through the main block 56 between the outer surface 50 at a top end of the block 56 and at a bottom end of the block 56 opposite the top end. As can be seen in FIG. 9, the outer surface 50 has an opening therein that is the approximate shape of the ruler 2, 2'.

Center bodies 26 and 26*a* (FIGS. 9-12) are generally flat rectangular bodies that also extend outward from the main block 56 and contain the following major features: curved fastening elements 27 and 27*a*, and guide elements 35, 35*a*, 40, and 40*a*. Center bodies 26 and 26*a* are intended to fit without interference in the center tracks 8, 8*a*and 8' of the ruler 2, 2' when the components 4, 5, 6, and 7 are in the assembled state 3 and the protractor unit 3 is in the unlocked state (FIG. 28(*a*)) and slidably engaged (e.g., as in FIG. 1(*a*)) to a ruler 2, 2' as described in detail below.

Guide elements 40 and 40*a* (FIGS. 9-12) extend outward from the center bodies 26 and 26*a* and are preferably cylindrical in shape, but can also be of any shape as long as the shape and cross-dimensions cooperate with those of the guiding slots 145 and 145*a* on the sliding lock 7 (FIG. 22-25(*b*)) such that guide elements 40, 40*a* can slidably engage the curved guiding slots 145, 145*a*, as shown in FIGS. 28(*a*) through 28(*c*).

Shoulder elements 47 and 47*a* (FIGS. 9-12) are intended to be concentric with the guide elements 40 and 40*a* and have a larger cross-sectional width, as well as an equal, centered, and aligned width-wise cross-sectional shape as the round guide elements 40, 40*a*; shoulder elements 47 and 47*a* are also intend to extend outward from the center bodies 26 and 26*a* less than the guide elements 40 and 40*a*. Further, shoulder elements 47 and 47*a* are intended to slidably engage and cooperate with the shape and cross-sectional dimensions of the shoulder elements 170, 170*a*, 171, 171*a*, 171*b*, 171*c*, 172, 172*a*, 172*b*, 172*c* on the sliding lock 7 such that the protractor units 3, 3', 3" on ruler-protractor assemblies, such as assemblies 200, 300, 301, 400, 401, 500, 600, 800, 801, shown in FIGS. 26(*a*)-33(*b*), can be manipulated to the locked state by the mechanisms described in detail below.

Guide elements 35 and 35*a* (FIGS. 9-12) extend outward from the center bodies 26 and 26*a* and preferably have a rectangular shape, but can also be of any shape as long as both its shape and cross-dimensions cooperate with those of the guide elements 86 and 86*a* of the translation block 6 (FIGS. 17-21(*b*)) such that guide elements 35, 35*a* can slidably engage the guide elements 86, 86*a* as discussed below and shown in FIGS. 28(*a*) through 28(*c*). Guide elements 35 and 35*a* are intended to prevent lateral and rotational movement of the translation block 6 when the components 4, 5, 6, and 7 are in the assembled state 3 and the sliding protractor component 3 is being handled independently of a ruler 2, 2'.

Curved guide elements 27 and 27*a* (FIGS. 9-12) extend outward from the center bodies 26, 26*a* and have a curved shape and a constant thickness with an inner and outer radii that are concentric with respect to each other and that are respectively co-radial with the inner and outer radii of the rotational-guide slots 61, 61 on the protractor component 5 (FIGS. 8 and FIGS. 13-16(*b*)) when the protractor component 5 is assembled onto the assembly block 4. Further, the guide elements 27 and 27*a* are intended to mate and slidably engage the rotational-guide slots 61 and 61*a* when the components 4, 5, 6, and 7 are in the assembled state 3, as shown in FIGS. 26(*a*) through 26(*b*), such that the protractor 5 is able to rotate unobstructedly about a virtual pivot 901 (FIG. 10) that is in fact the same point as or in proximity to the center point 901 of the imaginary circle 900 created by the radii of the curved guide elements 27 and 27*a* (FIG. 10).

Figure 10:
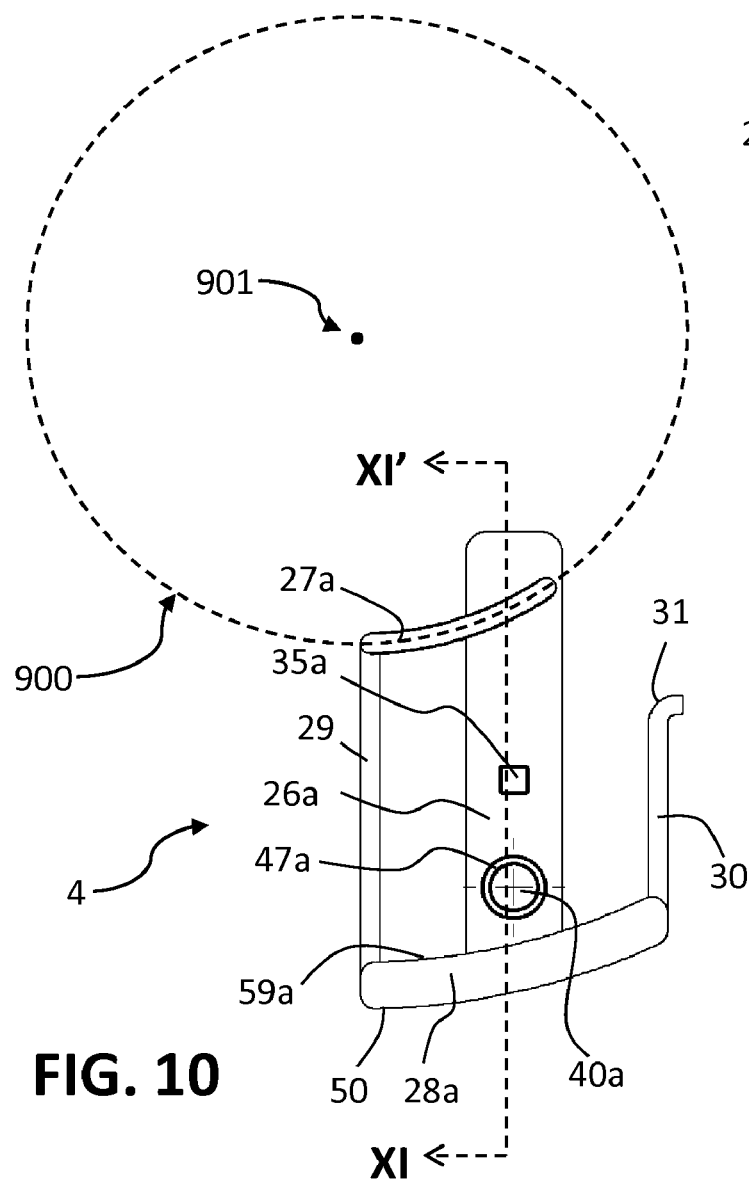
FIG. 10 is a bottom view of the assembly block shown in FIG. 9.
Figure 11:
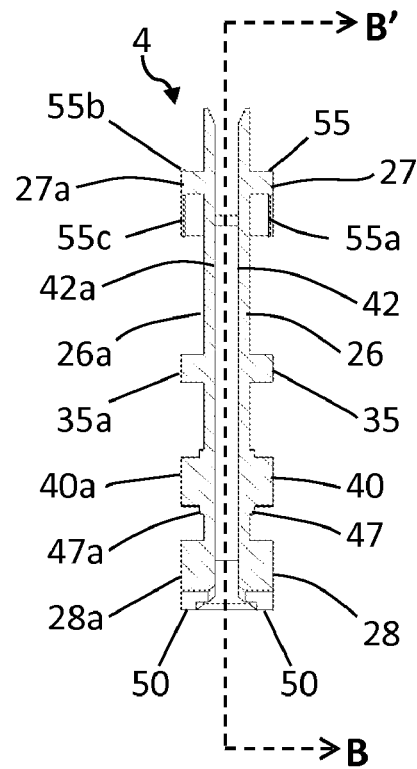
FIG. 11 is a cross-sectional view of the assembly block taken from the cutting plane XI-XI' as shown in FIG. 10.
Figure 12:
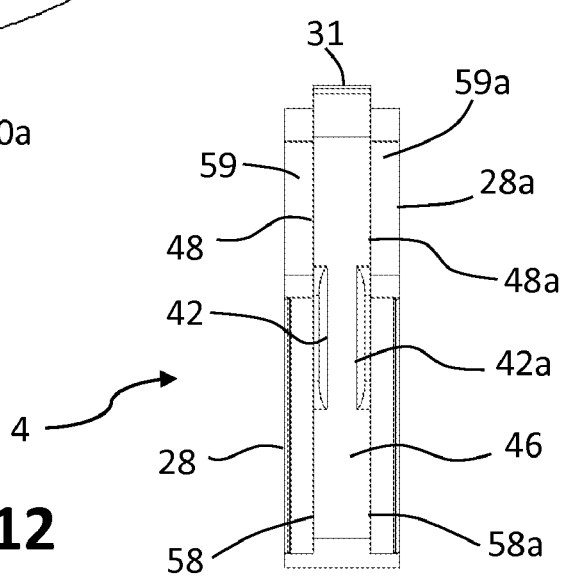
FIG. 12 is a back view of the assembly block shown in FIG. 9.

The magnitude of the radii on the curved guide elements 27 and 27*a* (FIGS. 9-12) and the orientation of the circumference of the imaginary circle 900 (FIG. 10) with respect to the center bodies 26, 26*a* are determined by the position of the center point 901 (FIG. 10). Further, the position of the center point 901 is selected such that when a protractor unit 3 is both slidably engaged (FIG. 1(*a*), for example) to a first ruler 2 and a second ruler 2' is simultaneously, laterally fastened to the protractor unit 3, as in assembly 200 (FIGS. 26(a)-27(c)), the pivot point 901 lies in the center of circle created by the radius on the tip of the female fastening elements 12, 12a, 12' on the laterally fastened unit ruler 2' (FIGS. 4(b) and 4(c)) and this same radius on the tip of the of the female fastening element 12, 12a, 12' of the laterally fastened ruler 2' is tangent or in proximity to the edge 22 of the slidably engaged ruler 2.

Figures 15B, 16A, 16B:
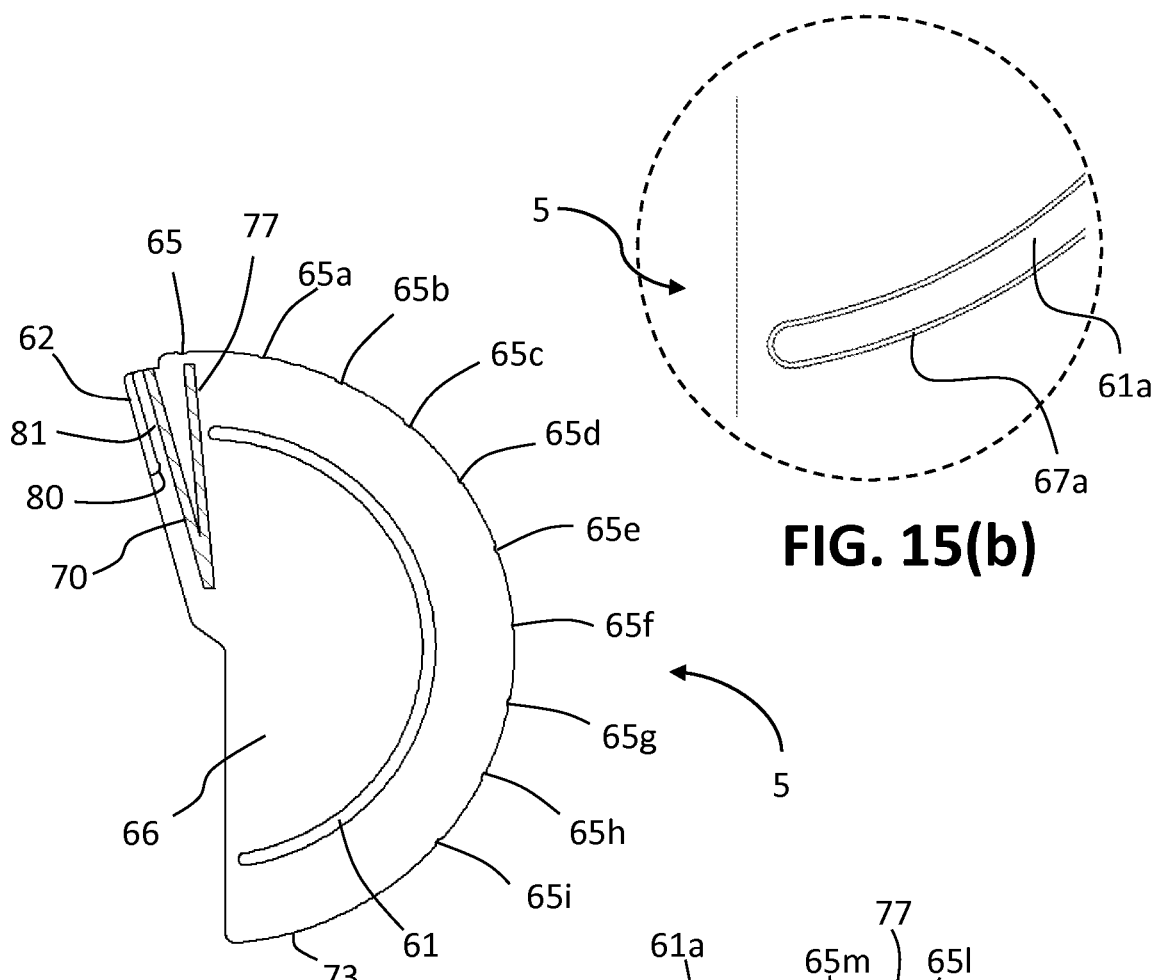
FIG. 15(b) is a detailed and magnified view of the shoulder element on the protractor component shown in FIG. 14.
FIG. 16(a) is cross-sectional view of the protractor component taken from the cutting plane XVI(a)-XVI(a)' as shown in FIG. 15(a).
FIG. 16(b) is cross-sectional view of the protractor component taken from the cutting plane XVI(b)-XVI (b)' as shown in FIG. 15(a).
Figure 17:
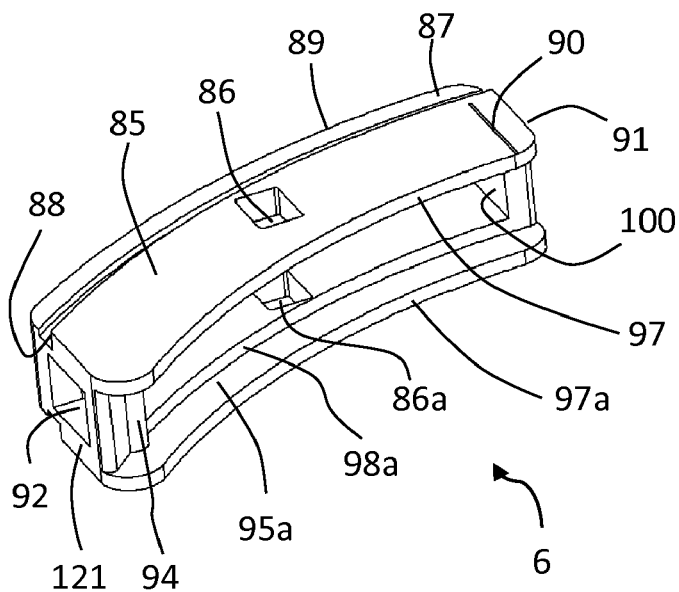
FIG. 17 is an isometric view of the translation block, a component of the protractor unit, shown in FIG. 8.

Snap features 55, 55a, 55b, and 55c (FIGS. 9-12) may be located on the outer edge curved guide elements 27 and 27 that engage the recessed surfaces 67 and 67a (FIG. 15(b)) around the edges of the rotational-guide slots 61 and 61 a when protractor component 5 (FIGS. 13-16(b)) is assembled onto the assembly block 4 (FIGS. 2 and 8) and provide mechanical stability to center bodies 26, 26a of the assembly block 4 by preventing bodies 26, 26a from collapsing medially toward the plane B-B (FIG. 11) when the components 4, 5, 6, and 7 are in the assembled state 3 and the protractor unit 3 is handled independently of any ruler 2, 2'.

Center bodies 26 and 26a (FIGS. 9-12) and the curved guide elements 27 and 27a on the assembly block 4 are integral in locking the rotational motion of the protractor component 5 (FIGS. 13-16(b) and FIGS. 26(a)-26(d)) when (i) the components 4, 5, 6 and 7 are in the assembled state 3, (ii) the protractor unit 3 is slidably engaged to a ruler 2, 2', and (iii) the protractor unit 3 is in the angle-locked state 148 or fully-locked state 147 (FIGS. 28(a)-28(c)), as is later described; the function of features 26, 26a, 27, and 27a is made clear by describing the locking mechanism itself, which occurs as follows: as the sliding lock 7 is moved toward the angle-locked position 148 or fully-lock position 147, the curved guiding slots 145 and 145a on the sliding lock 7 (FIGS. 22-25(b)) slide through the round guide elements 40, 40a on the assembly block 4 such that the curvature of slots 145 and 145a changes from the curve 151 and 151a to the curve 152 and 152a; this change in curvature causes the distance between the round guide elements 40 and 40a on the assembly block 4 and the surfaces 134 and 134a on the sliding lock 7 (FIGS. 22-25(b)) to increase; this increase in turn causes the sliding lock 7 to translate toward the translation block 6 (FIGS. 17-21(b)) and specifically, the surfaces 134 and 134a on the sliding lock 7 to push on the translation block 6, causing the translation block 6 to translate toward the protractor component 5 and specifically, the surfaces 98 and 98a on the translation block 6 to push on the surfaces 73 and 73a on the protractor component 5 such that sufficient friction is created to arrest rotation motion of the protractor component 5.

Figure 27A:
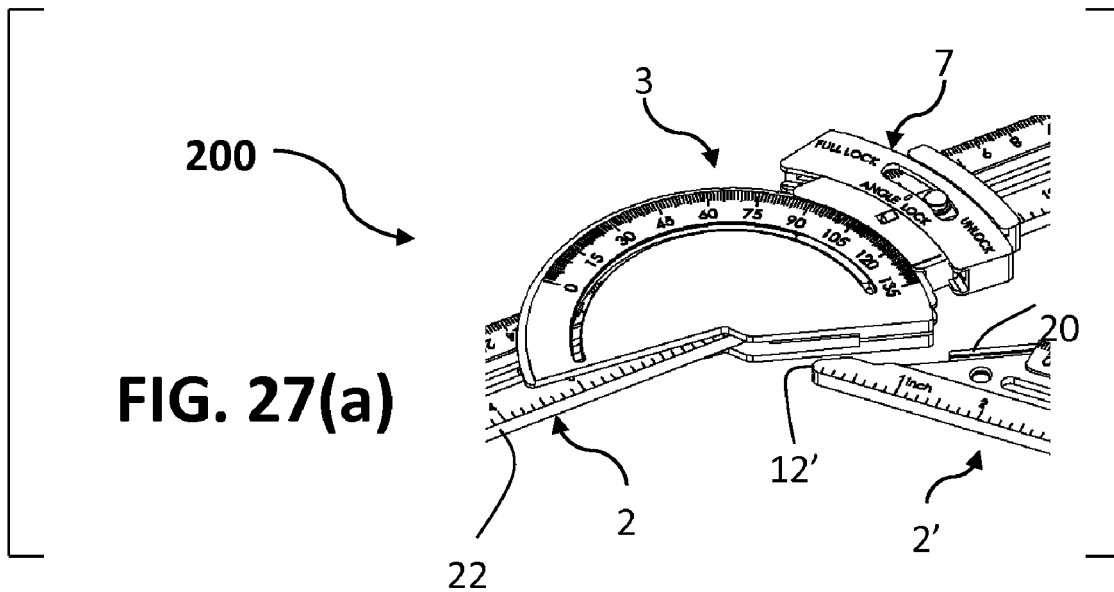
FIGS. 27(a) through 27(c) are magnified isometric views of at least one embodiment of the invention as shown FIGS. 26(a) through 26(d) that illustrate how to laterally fasten a ruler to a protractor unit that already has a ruler slidably engaged to it.
Figure 27B:
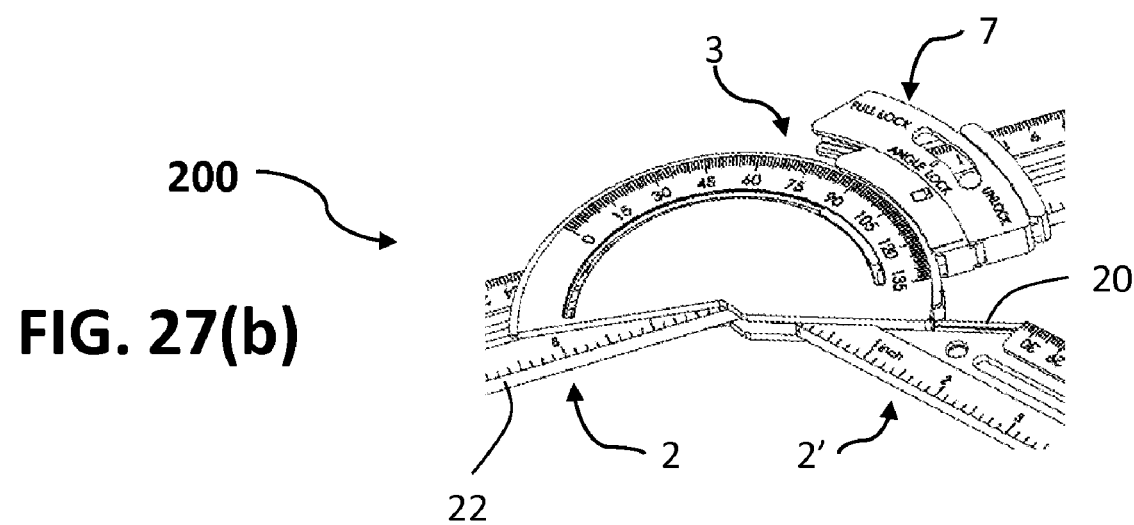
Figure 27C:
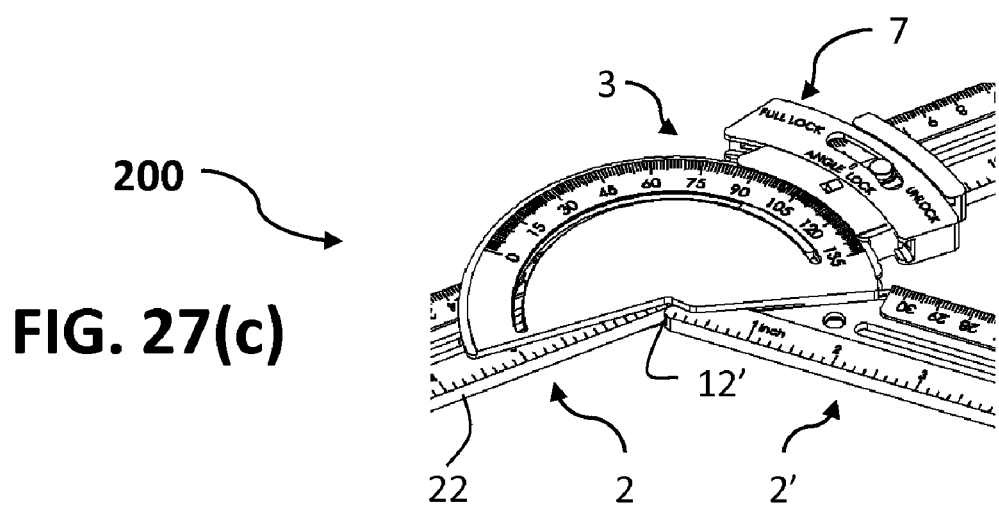

Additionally, each of the features 27, 27a, 35, 35a, 40, and 40a (FIGS. 9-12) should be positioned on the center bodies 26 and 26a at precise distances and orientations such that they 27, 27a, 35, 35a, 40, 40a can properly mate with their respective mating features 61, 61a, 86, 86a, 145, 145a (FIGS. 8-25(b)) and execute their intended functions, as described herein; so that the components 4, 5, 6, and 7 can be assembled 3 in the manner as described herein, and the protractor unit 3 can simultaneously slidably engage (FIG. 1(a), for example) and laterally fasten (FIGS. 27(a)-27(c)) rulers 2, 2' and function as intended.

Additionally, the top and bottom surfaces of the side bodies 29, and 30 and outward-facing surfaces of the center bodies 26 and 26a (FIGS. 9-12) with respect to the center plane B-B (FIG. 11), should be level with or in proximity to each other and to the minor surfaces 10, 10a, 10b, 10c, 10', 10b' (FIGS. 1(a)-7(b)) when the components 4, 5, 6, and 7 are in the assembled state 3 and the protractor unit 3 is slidably engaged to a ruler 2, 2'. Further, these same surface 26, 26a, 29, 30 should not obstruct the rotational movement of the protractor component 5 when the subcomponents 4, 5, 6, and 7 are in the assembled state 3 and the protractor unit 3 is slidably engaged to a ruler 2, 2'.

Generally referring to FIGS. 1(a)-2, FIG. 8, and FIGS. 13-16(b), the protractor component 5, a component of the protractor unit 3, preferably has semicircular shape of either constant, variable, or linearly increasing or decreasing radius, that cooperates with the intended motions and functions of the protractor component 5 itself and the components 4, 6, and 7 of the protractor unit 3 when the components 4, 5, 6, and 7 are in the assembled state 3 and the protractor unit 3 is either slidably engaged or laterally fastened to a protractor unit 3, or both.

The protractor component 5 (FIGS. 13-16(b)), in one embodiment, contains the following major features: the rotational-guide slots 27 and 27a, the female mating elements 65-65i and 65l-65t, recessed surfaces 64 and 64a, major outer 60 and 60a and inner surfaces 66 and 66a, stabilizing blocks 70 and 77, track 81, snap features 80 and 80a, and the surfaces 62, 62a, 71, 71a, 72, 72a, 73 and 73a; further, all of these features are preferably symmetrical about both the cutting planes XVI(a)-XVI(a)' and XVI(b)-XVI(b)' as shown in FIGS. 15-16(a).

Figure 28A:
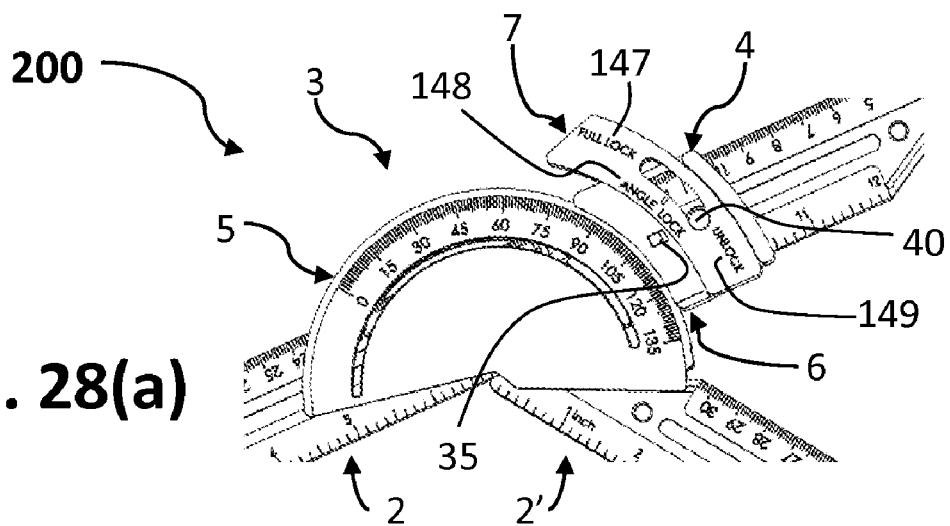
FIGS. 28(a) through 28(c) are magnified isometric views of the same two-ruler assembly shown in FIGS. 26(a) through 26(d) that illustrate how the sliding lock can be manipulated to either lock only the angle between rulers or to lock both the angle between rulers and translation of a protractor unit along the ruler that is slidably engaged to it.
Figure 28B:
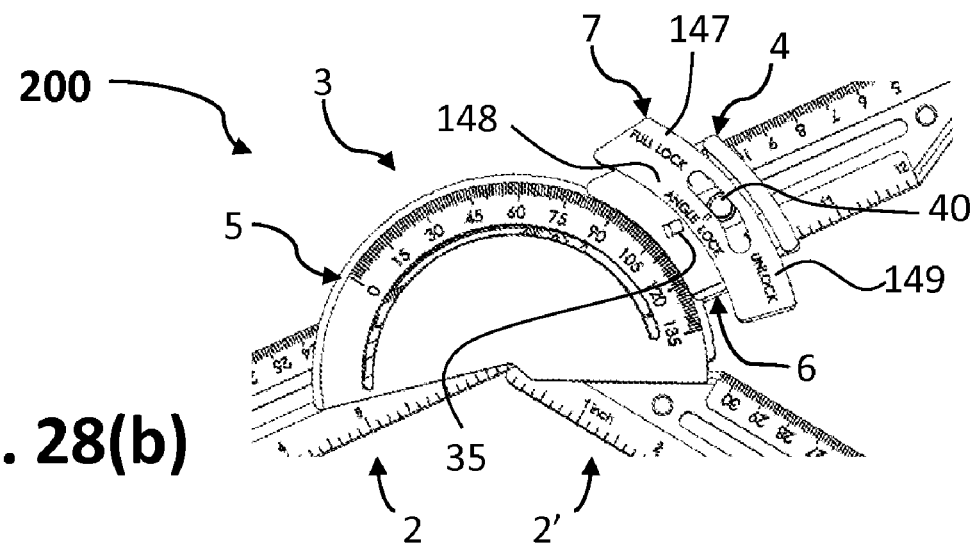
Figure 28C:
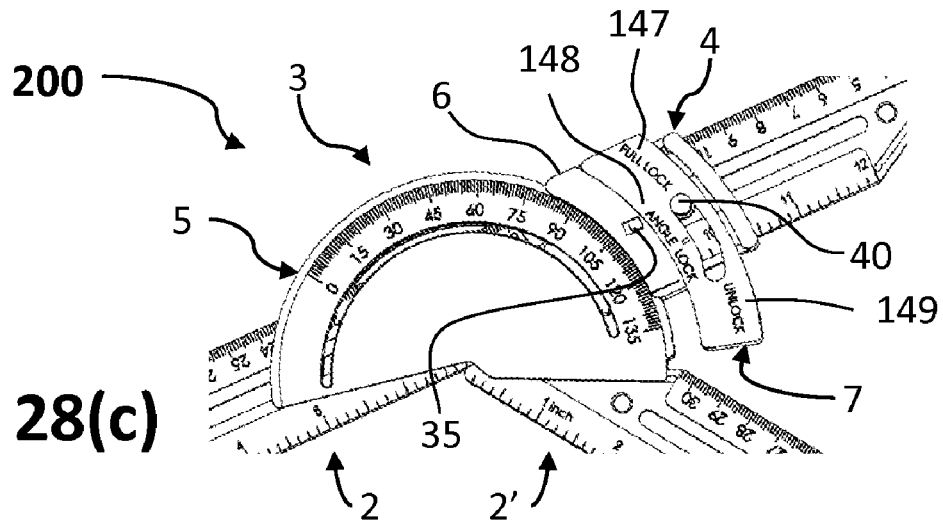
Figure 29A:
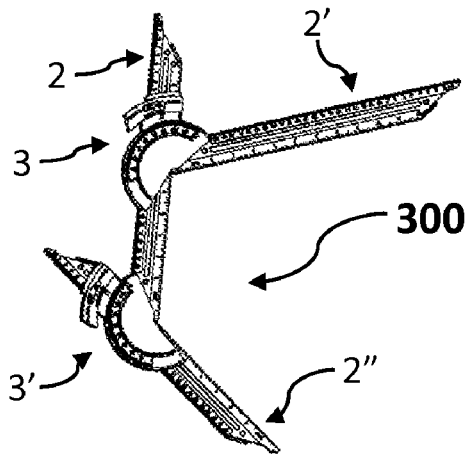
FIGS. 29(a) is a top view of at least one embodiment of the invention according to the preferred embodiment that illustrates how open 3-ruler geometric configurations can be created.
Figure 29B:
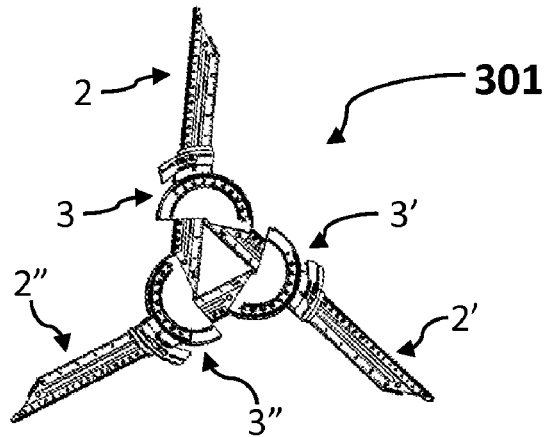
FIGS. 29(b) is a top view of at least one embodiment of the invention according to the preferred embodiment that illustrates how simple triangular configurations can be created.
Figure 30A:
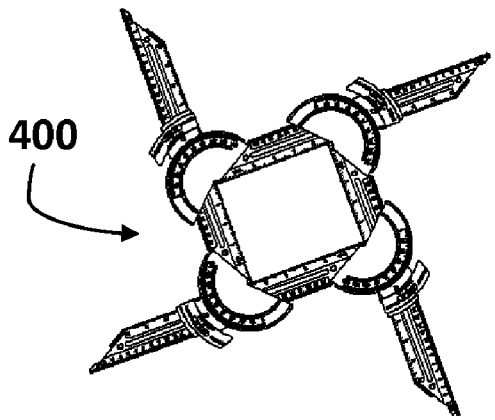
FIGS. 30(a) and 30(b) are top views of at least one embodiment of the invention according to the preferred embodiment that illustrates how small rectangular configurations can be scaled to a larger sizes while holding the same common angles between rulers.
Figure 30B:
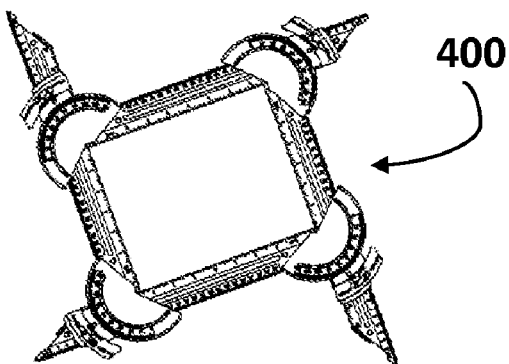
Figure 30C:
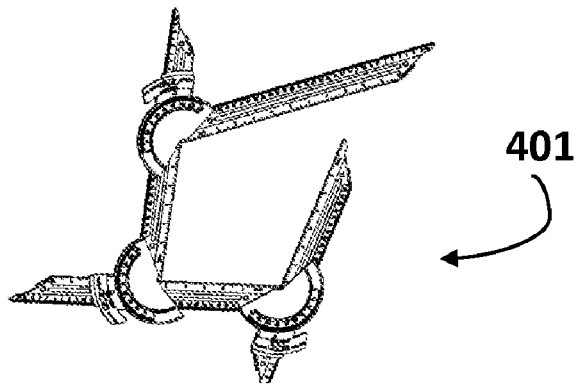
FIGS. 30(c) is a top view of at least one embodiment of the invention according to the preferred embodiment that illustrates how open quadrilateral configurations can be created.
Figure 31:
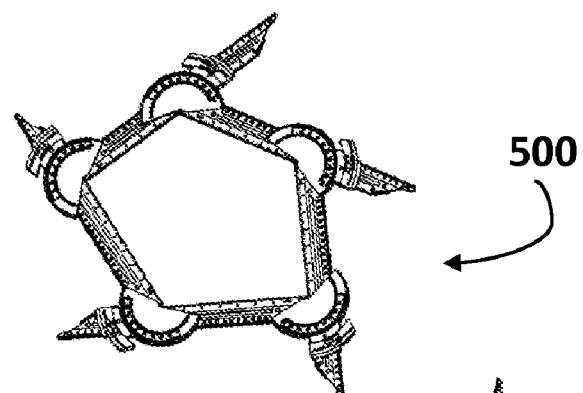
FIGS. 31 is a top view of at least one embodiment of the invention according to the preferred embodiment that illustrates how closed and irregular, pentagonal configurations can be created.
Figure 32:
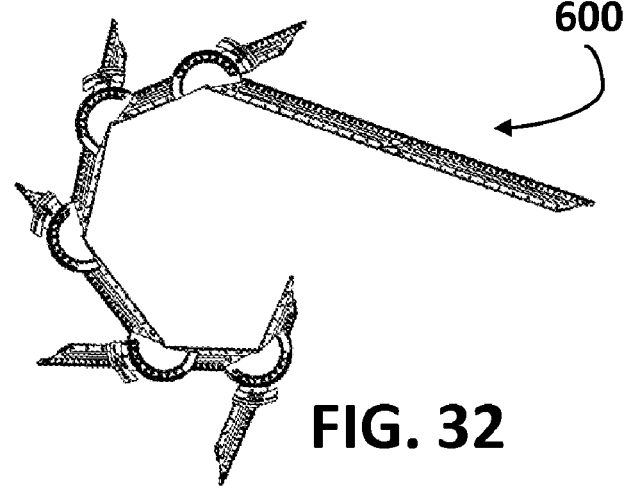
FIGS. 32 is a top view of at least one embodiment of the invention according to the preferred embodiment that illustrates how open and irregular, hexagonal configurations with consecutive ruler attachments can be created.
Figure 33A:
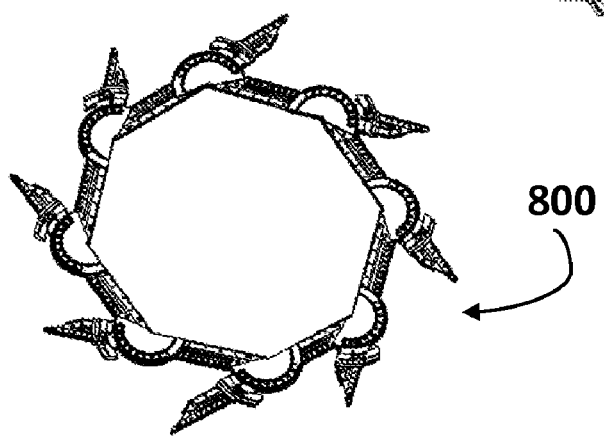
FIGS. 33(a) is a top view of at least one embodiment of the invention according to the preferred embodiment that illustrates how closed octagonal configurations can be created.
Figure 33B:
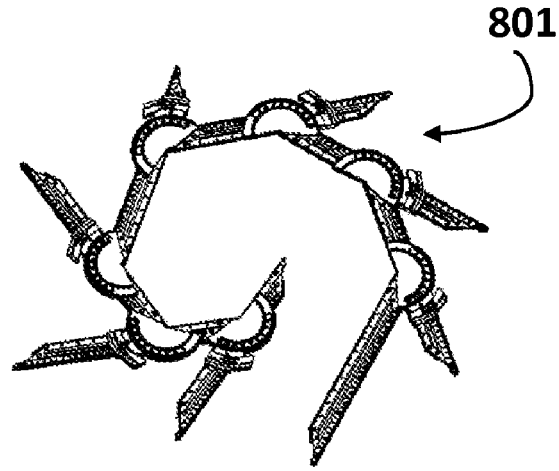
FIGS. 33(b) is a top view of at least one embodiment of the invention according to the preferred embodiment that illustrates how open and spiral-like, octagonal configurations can be created.

Component 5 (FIGS. 13-16(b)) assembles onto the assembly block 4 (FIG. 8 and FIGS. 9-12) with components 6 and 7 such that: the protractor component 5 is able to rotate unobstructedly when the protractor unit 3 is in an unlocked state 149 (FIG. 28(a)-28(c)); the inner surfaces 66 and 66a of the protractor component 5 are in contact with or in proximity to the outward-facing surfaces of the center bodies 26 and 26a (FIG. 11) and the minor surfaces 10, 10a, 10b, 10c, 10' and 10b' of the ruler 2, 2' (FIGS. 1(a)-7(b)); the rotational-guide slots 61, 61 a are be snapped into or over the snap features 55, 55a, 55b, 55c of the curved guide elements 27, 27a on the assembly block 4 (FIGS. 9-12) such that the snap features 55, 55a, 55b, 55c sit in the recessed surfaces 67, 67a (FIGS. 13 & 15(b)) and the top surfaces of the curved guide element 27, 27a are level with or in proximity to the outer surfaces 60 and 60a of the protractor component 5; and the rotational-guide slots 61 and 61a are slidably engaged with the curved guide features 27 and 27a on the assembly block 4.

Slot 63, track 81, and snap features 80 and 80a (FIGS. 13-16(b)) are intended to function in and cooperate with the lateral fastening of a ruler 2, 2' to the protractor component 5 when the components 4, 5, 6 , and 7 are in the assembled state 3 (FIGS. 27(a)-27(c)). The track 81 on the protractor component 5 (FIGS. 16(a)-16(b)) has a select cross-sectional shape and dimensions that are to compliment those of any set of paired male locking elements 20 & 20a, 20b & 20c on the male fastening element 12, 12a, 12' on the same end 13, 13a, 13' of any ruler 2, 2' (FIGS. 1(a)-7(b)) such that these locking elements 20 & 20a, 20b & 20c are able to slide into the track 81 and allow any paired set of snap features 19, & 19a, 19b & 19c on the same end 13, 13a,13' of the ruler 2, 2' to fully engage the male snap features 80 and 80a of the protractor component 5.

Slot 63 (FIGS. 13-16(b)) has a select cross-sectional shape and dimensions that are to accommodate and allows the material between any set of paired tracks 17 & 17a, 17b & 17c on the male fasten elements 11, 11a, 11' on the same end 13, 13a, 13' of any ruler unit 2, 2' (FIGS. 1(a)-7(b)) to slide through and mate with slot 63 when the male locking elements 20, 20a, 20b, 20c, 20' (FIGS. 1(a)-7(b)) are slid into the track 81 to allow the female snap features 19, 19a, 19b, 19c and 19' of the ruler 2, 2' to fully engage the male snap features 80 and 80a of the protractor component 5 (FIGS. 16(a)-16(b)).

Snap features 80 and 80a (FIGS. 16(a)-16(b)) also have a select shape and cross-sectional dimension that allow it to engage any pared set of snap features 19, & 19a, 19b & 19c on the same end 13, 13' of the ruler 2, 2' (FIGS. 1(a)-7(b)). Additionally, when a protractor unit 3 is both slidably engaged to a first ruler 2 and laterally fastened to a second ruler 2' (FIGS. 26(a)-27(c))—the snap features 19, 19a, 19b, 19c, and 19' on the laterally fastened ruler 2' are to engage the snap features 80 and 80a on the protractor component 5 so as to hold the laterally fastened ruler 2' at a position where the radius on the tip of ruler 2' female fastening elements 12, 12a, 12' (FIGS. 1(a)-7(b)) is to be tangent or in proximity to the edge 22 of the slidably engaged ruler 2 (FIGS. 27(a) and 27(b)) and such that the protractor component 5 of the protractor unit 3 is able to rotate unobstructedly, as in FIGS. 26(a) through 26(d), without allowing the snap feature 19, 19a, 19b, 19c, and 19' to disengage the snap features 80 and 80a.

Surfaces 73 and 73a (FIGS. 13-16(b)) of the protractor component 5 are intended to have a radius that is constant, or that increases or decreases linearly in proportion to angular rotation, and an overall shape that compliments and is in proximity to the surfaces 98 and 98a on the translation block 6 (FIGS. 17-21(b)) such that the protractor component 5 is able to rotate unobstructedly (FIGS. 26(a)-26(d)) when the components 4, 5, 6, and 7 are in the assembled 3 and unlocked state 149 (FIG. 28(a)). Further, the surfaces 98 and 98a on the protractor component 5, or the optional elastomeric or rubber material that may be adhered to these surfaces 98 and 98a, should impart sufficient friction on surfaces 73, 73a (of the protractor component 5) to arrest the rotational motion of the protractor component 5 when the components 4, 5, 6, 7 are in the assembled state 3 and the protractor unit 3 is manipulated to the angle-locked or fully-locked state as described below.

Recessed surfaces 64 and 64a (FIGS. 13-16(b)) have a select and preferably constant depth and have a width that ranges from the surfaces 73 and 73a to the back walls 68 and 68a. These surfaces 64 and 64a should be in proximity to the surfaces 95 and 95a on the translation block 6 (FIGS. 17-21(b)) and have sufficient depth to allow the surfaces 95 and 95a to slide unobstructedly over surfaces 64 and 64a when the components 4, 5, 6 and 7 are in the assembled state 3, regardless of whether the protractor unit 3 is in a locked 147,148 or unlocked state 149 (FIGS. 28(a)-28(c)). Further, these recessed surfaces 64 and 64a in cooperation with the surfaces 95 and 95a, in addition to the snap features 55, 55a, 55b, 55c (FIG. 11), prevent the surfaces 60 and 60a on the component 5 from flaring outward away from the planes XVI(a)-XVI(a)' and XVI(b)-XVI(b)' when the components 4, 5, 6, and 7 are in the assembled state 3.

Additionally, the back walls 68 and 68a (FIGS. 13-16(b)) on the protractor component 5 should not contact the surfaces 97 and 97a on the translation block 6 (FIGS. 17-21(b)) when the components 4, 5, 6, and 7 are in the assembly state 3, regardless of whether the components 4, 5, 6 and 7 are in motion and regardless of whether the protractor unit 3 is in a locked 148, 147 or unlocked state 149.

Mating elements 65-65i and 65l-65t (FIGS. 13-16(b)) are optional and can be configured in patterns, pluralities, single sets or a set, or located anywhere about the surfaces 73 and 73a. These features 65-65i and 65l-65t are preferably semicircular in shape and are intended to mate with the feature 94 on the translation block 6 (FIGS. 17-21(b)) for the purpose of providing a method of tactilely feeling select common angles prior to locking said angles, when the components 4, 5, 6, and 7 are in the assembled state 3. The mechanism by which this is accomplished is as follows: as the sliding lock 7 (FIGS. 22-25(b)) is moved so as to put the protractor unit 3 in either the angle-locked 148 or fully-locked state 147, the translation block 6 itself and specifically, the block's 6 surfaces 98 and 98a move towards the surfaces 73 and 73a on the protractor component 5, or towards the optional elastomeric or rubber material that may be adhered to the surfaces 73 and 73a, in order to arrest the rotational motion of the protractor component 5; prior to the friction locking of protractor component's 5 rotation motion, stop feature 94 on the translation block engages the mating elements 65-65i and 65l-65t on the protractor component 5, causing a perceivably loose and semi-permanent stop in the protractor component's 5 rotation.

The protractor component 5 (FIGS. 13-16(b)) also contains angle markings on each of its surfaces 60 and 60a which corresponds to the angle that is created between two ruler units 2, 2' when one ruler 2 is slidably engaged to a protractor unit 3 and another ruler 2' is laterally fastened to the same protractor unit 3, as shown in FIGS. 26(a) through 26(d). The correct angle can be read by aligning the angle markings on the protractor component 5 with the reference markings 90 and 90a on the translation block 6 (FIGS. 17-21(b)).

Generally referring to FIGS. 1(a)-2, FIG. 8, and FIGS. 17-21(b), the translation block 6 a component of the protractor unit 3 has rectangular tubular internal 105 and external cross-sectional shape and dimensions that cooperate with the intended motions and functions of the translation block 6 itself and the components 4, 5, and 7 of the protractor unit 3 when the components 4, 5, 6, and 7 are in the assembled state 3 and the protractor unit 3 is either slidably engaged to a protractor unit 3 or laterally fastened to a protractor unit 3, or both.

Figure 18:
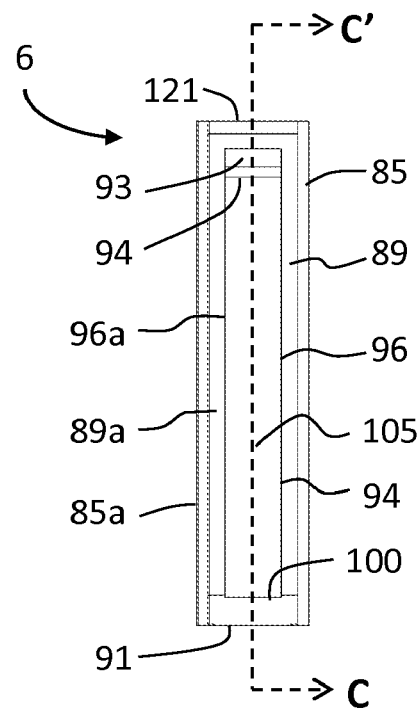
FIG. 18 is a back view of the translation block shown in FIG. 17.
Figure 19:
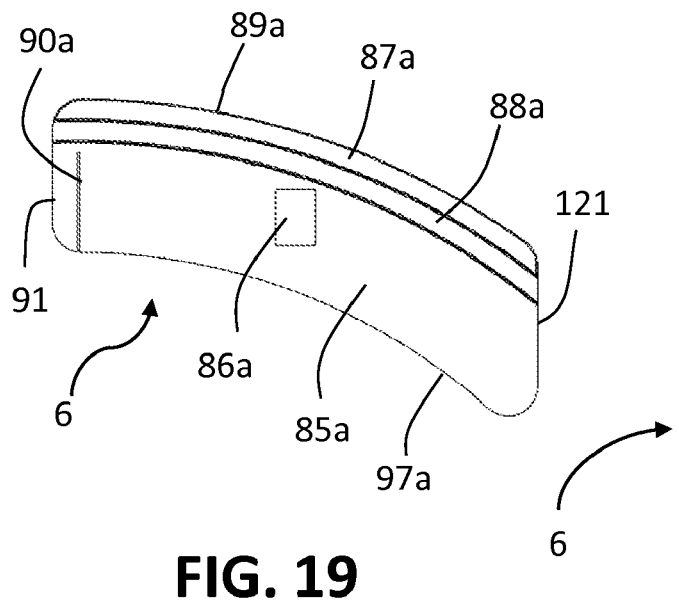
FIG. 19 is a bottom view of the translation block shown in FIG. 17.
Figure 20:
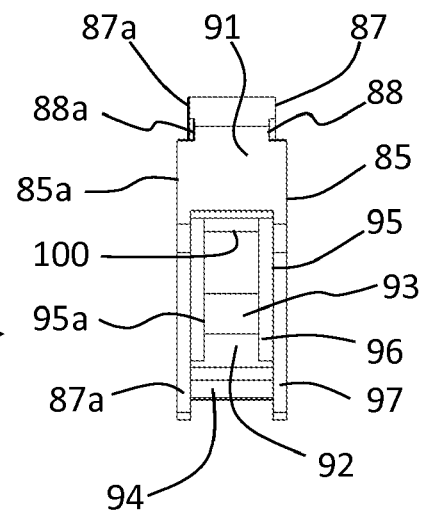
FIG. 20 is a right view of the translation block shown in FIG. 17.

The translation block 6 (FIGS. 17-21(b)) contains the following major features: the locking surfaces 98 and 98a ; recessed surfaces 95 and 95a; curved surfaces 89, 89a, 97, and 97a ; mating feature 92 and 94; guiding elements 86 and 86a; mating tracks 88 and 88a; and gauge marking 90 and 90a. Additionally, these features are all symmetrical about the plane C-C', as shown in FIGS. 18.

Component 6 (FIGS. 17-21(b)) assembles onto the assembly block 4 with components 5 and 7 (FIG. 8 and FIGS. 9-12) such that: the translation block 6 is able to translate unobstructedly towards or away from the protractor component 5 when the sliding lock is manipulated to one of the locked 147, 148 or unlocked states 149 (FIGS. 28(a)-28(c)); the protractor component 5 is able to rotate unobstructedly when the protractor unit 3 is in an unlocked state 149; the sliding lock 7 is able to slide unobstructedly regardless of whether the protractor unit 3 is in a locked 147, 148 or unlocked state 149; the inner surfaces 96 and 96a of the translation block 6 are in contact with or in proximity to the outward-facing surfaces of the center bodies 26 and 26a (FIG. 11) and the minor surfaces 10, 10a, 10b, 10c, 10', 10b' of the ruler 2, 2' (FIGS. 1(a)-7(b)); the internal side walls of the translation block 6 are to be in close proximity to the side walls of the side bodies 29 and 30 of the assembly block 4 (FIGS. 9-12).

Surfaces 98 and 98a and 97 and 97a (FIGS. 17-21(b)) are to be concentric with each other and concentric with and compliment in both shape and cross-sectional dimensions the mating surfaces 73 and 73a and 68 and 68a on the protractor component 5 (FIGS. 13-16(b)) when the components 4, 5, 6 and 7 are in the assembled state 3. Also, the surfaces 98 and 98a are to not engage the surfaces 73 and 73a so as to allow the protractor component 5 to rotate unobstructedly when the protractor unit 3 is in an unlocked state 149 (FIG. 28(a)), but are to engage the surfaces 73 and 73a of the protractor component 5 when the protractor unit 3 is manipulated to the locked state 147, 148 (FIGS. 28(b)-28(c)), as described herein, such that surfaces 98 and 98*a* impart sufficient friction on surfaces 73 and 73*a* to arrest the rotational motion of the protractor component 5. Additionally, the surfaces 98 and 98*a* may be coated or covered with a polymeric, elastomeric, or rubber material in order to increase the effectiveness of locking by friction, as described above. Also, the surfaces 97 and 97*a* should not contact the surfaces 64 and 64*a*, regardless of whether the protractor unit 3 is in a locked state 147, 148 or not 149.

Recessed surfaces 95 and 95*a* (FIGS. 17-21(*b*)) have a select and preferably constant depth and have a width that ranges from the surfaces 97 and 97*a* to the back walls 98 and 98*a*. These surfaces 95 and 95*a* should be in proximity to the surfaces 64 and 64*a* on the protractor component 5 (FIGS. 13-16(*b*)) and have sufficient depth to allow the surfaces 64 and 64*a* to slide unobstructedly over the surfaces 98 and 98*a* when the components 4, 5, 6 and 7 are in the assembled state 3, regardless of whether the protractor unit 3 is a locked 147, 148 or unlocked state 149 (FIGS. 28(*a*)-28(*c*)). Further, these recessed surfaces 95 and 95*a* in cooperation with the surfaces 64 and 64*a* prevent the surfaces 60 and 60*a* on the protractor component 5 from flaring outward away from the planes XVI(a)-XVI(a)' and XVI(b)-XVI(b)', shown in FIG. 15(*a*) when the components 4, 5, 6, and 7 are in the assembled state 3.

Surfaces 89 and 89*a* (FIGS. 17-21(*b*)) on the translation block 6 are to be concentric with and compliment in both shape and cross-sectional dimensions the surfaces 142, 142*a*, and 142*b* on the sliding lock 7 (FIGS. 22-25(*b*)) when the components 4, 5, 6 and 7 are in the assembled state 3. Also, the surfaces 89 and 89*a* should not impart force on the surfaces 142 and 142*a* when the protractor unit 3 is in an unlocked state 149 (FIG. 28(*a*)), but should impart a force on the surfaces 142, 142*a*, and 142*b* to cause the translation block 6 to translate towards the protractor component 5 and lock rotational motion, when the protractor unit 3 is manipulated to either the angle-locked 148 or full-locked 147 state (FIGS. 28(*b*)-28(*c*)) in cooperation with the mechanisms as described herein.

Tracks 87 & 88 and 87*a* & 88*a* (FIGS. 17-21(*b*)) are optional and parallel or concentric with the surfaces 89 and 89*a* on the translation block 6 itself and compliment the shape of the tracks 137 & 136 and 137*a* & 136*a* on the sliding lock 7 (FIGS. 22-25(*b*)), respectively, such that tracks 87 & 88 and 87*a* & 88*a* slidably engage the tracks 137 & 136 and 137*a* & 136*a*, and the sliding lock 7 is able to slide unobstructedly so that sliding lock 7 can effect either a locked 147, 148 and unlocked state 149 (FIGS. 28(*b*)-28(*c*)) in the protractor unit 3, as described herein, assuming the components 4, 5, 6, and 7 are in the assembled state 3 and the sliding protractor 3 is slidably engaged or laterally fastened to a ruler 2, 2', or both slidably engaged and laterally fastened to rulers 2, 2'.

Figure 1B:
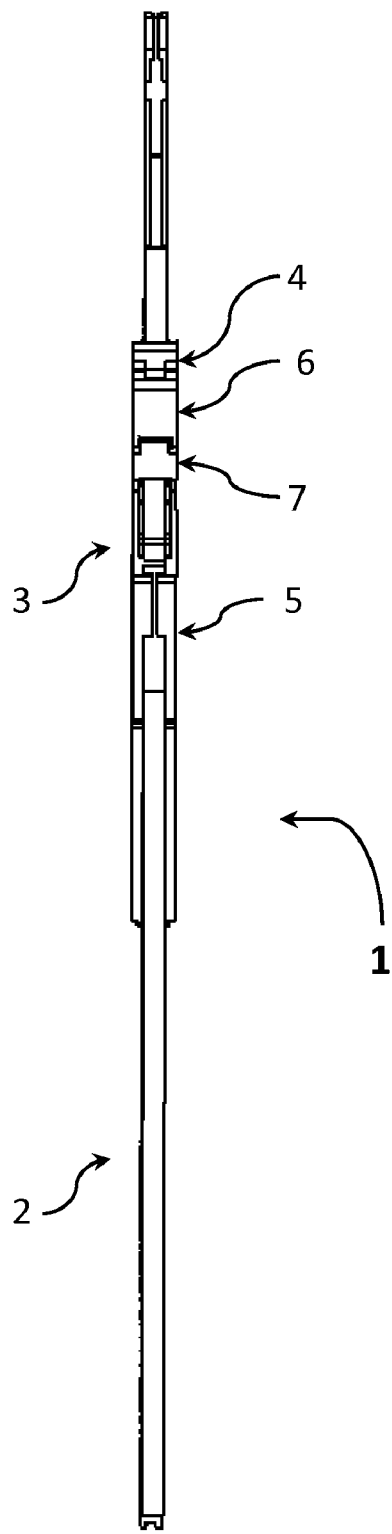
FIG. 1(b) is a left view of the tool shown in FIG. 1(a).

Features 86 and 86*a* (FIGS. 17-21(*b*)) on the translation block 6 are optional; if present, however, these features 86 and 86*a* preferably have a rectangular shape, but can also be of any shape as long as both its 86 and 86*a* shape and cross-dimensions cooperate with those of the guide elements 35 and 35*a* on the assembly block 4 (FIGS. 9-12) such that they 86 and 86*a* can slidably engage the guide elements 35 and 35*a* and guide the translation block 6 to translate to and from the protractor component 5 (FIGS. 1(*a*)-2 & 8) without lateral or rotational movement when the sliding lock 7 is manipulated to cause the protractor unit 3 to be in either a locked 147, 148 or unlock state 149 (FIGS. 28(*a*) through 28(*c*)), assuming that the components 4, 5, 6 and 7 are in the assembled state 3 and that when the sliding protractor component 3 is being handled independently of any ruler 2, 2'.

Feature 92 (FIGS. 17-21(*b*)) of translation block 6 is optional, but if present has a shape and cross-sectional dimensions that is to cooperate with that of feature 31 on the assembly block 4 (FIG. 9-12) such that these features 92 and 31 are able to mate and remain mated when the translation block 6 translates to or away from the protractor component 5 (FIGS. 13-16(*b*)) when the sliding lock 7 (FIGS. 22-25(*b*)) is manipulated to lock 147, 148 or unlock 147 the protractor unit 3 (FIGS. 28(*a*)-28(*c*)). This feature 92 is also a redundancy that is intended to prevent lateral and rotational movement of the translation block 6 in the event that the guiding elements 35 and 35*a* on the assembly block 4 undergo material failure and are unable to properly mate and cooperate with the guiding elements 86 and 86*a* of the translation block 6.

Stop feature 94 (FIGS. 17-21(*b*)) on the translation block 6 is optional, and if present, stop feature 94 preferably has a semi-circular in shape that that compliments that of the mating elements 65-65*i* and 65*l*-65*t* and is intended to mate with the mating elements 65-65*i* and 65*l*-65*t* for the purpose of providing a method of tactilely feeling select common angles on the protractor component 5 (FIGS. 13-16(*b*)) when the components 4, 5, 6, and 7 are in the assembled state 3 and the protractor unit 3 has both a ruler 2, 2' slidably engaged and laterally fastened to the protractor unit 3 (FIGS. 26(*a*)-26(*d*)); the mechanism by which this occurs has been described previously.

Marking 90 and 90*a* (FIGS. 17-21(*b*)) on the translation block are intended to act as reference marks for reading the angle marking on the protractor component 5 (FIGS. 13-16(*b*)) that corresponds to the angle that is created between rulers 2, 2' that are slidably engaged and laterally fastened to the same protractor unit 2 (FIGS. 26(*a*)-26(*d*)).

Figure 21A:
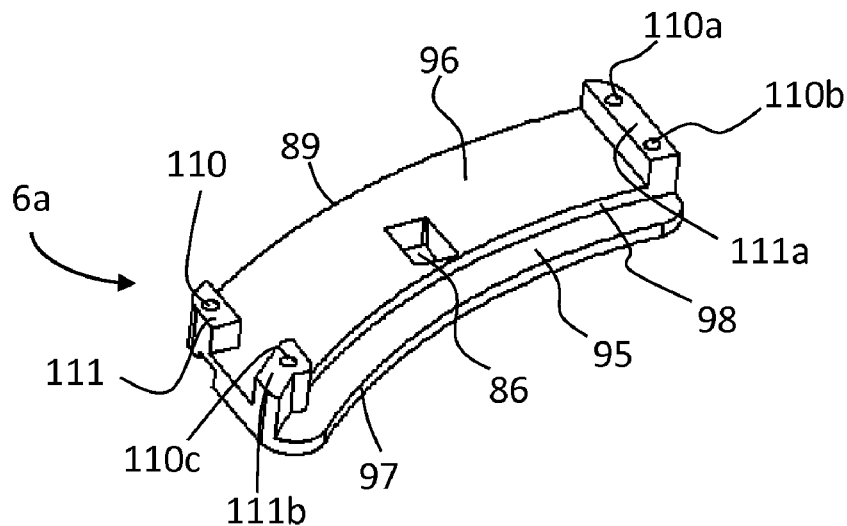
FIG. 21(a) is an isometric view of the top sub-component of the translation block shown in FIG. 17.
Figure 21B:
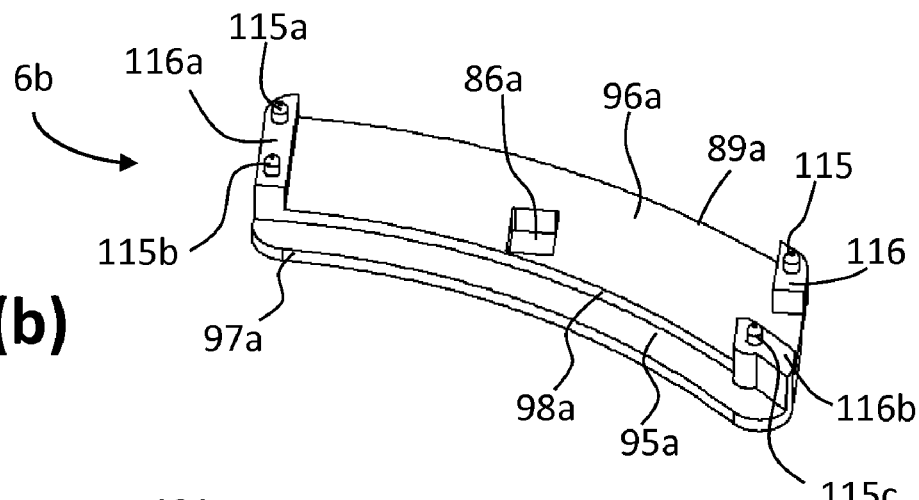
FIG. 21(b) is an isometric view of the bottom sub-component of the translation block shown in FIG. 17.
Figure 22:
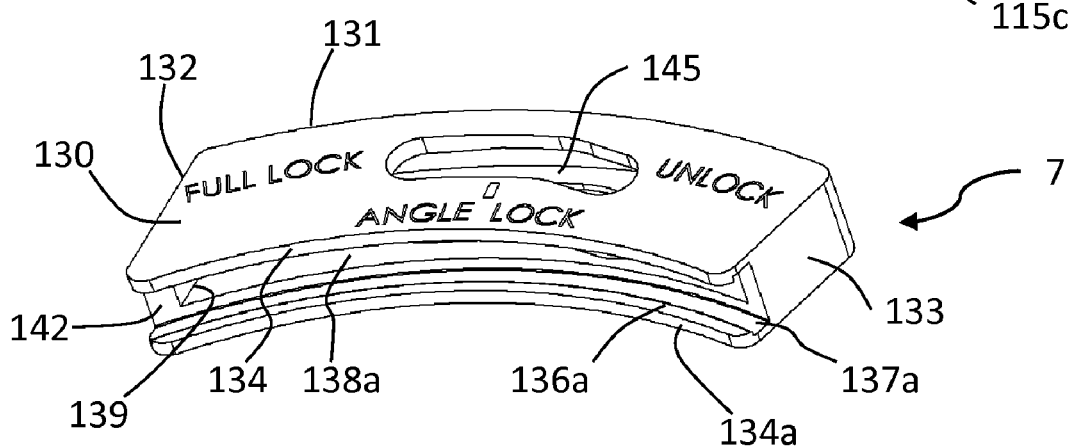
FIG. 22 is an isometric view of sliding lock, a component of the protractor unit, shown in FIG. 8.

The translation block 6 (FIGS. 17-21(*b*)) is also, preferably, composed of two symmetrical halves 6*a* and 6*b* as shown in FIGS. 21(*a*) and 21(*b*), the purpose of which is to facilitate the assembly of the translation block 6 onto the assembly block 4 (FIGS. 9-12). These two halves 6*a* and 6*b* can be put together into one part 6 by mating the features 110, 110*a*, 110*b*, and 110*c* on the subcomponent 6*a* with the features 115, 115*a*, 115*b*, and 115*c* on the subcomponent 6*b* such that the surfaces 116, 116*a* and 116*b* and surfaces 111, 111*a*, and 111*b*, respectively, are in contact or in proximity to each other. An adhesive can also be used to achieve a cohesive bond of appropriate strength between the two halves 6*a* and 6*b*.

Generally referring to FIGS. 1(*a*)-2, FIG. 8, and FIGS. 22-25(*b*), the sliding lock 7, a component of the protractor unit 3, has rectangular internal tubular 105 shape and external cross-sectional shape with curved front 134, 134*a*, 142, 142*a*, and 142*b* and back surfaces 131 and 131*a* that the compliment the shape of the back surface of the translation block 6 that facilitate sliding; the shapes of the surfaces 131, 131*a* 134, 134*a*, 142, 142*a*, and 142*b* should cooperate with the intended motions and functions of the sliding lock 7 itself and the components 4, 5, 7 of the protractor unit 3 when the components 4, 5, 6, and 7 (FIG. 8) are in the assembled state 3 and the protractor unit 3 is either slidably engaged (FIG. 1(*a*)) or laterally fastened to a protractor unit 3, or both (FIGS. 26(*a*)-27(*c*)).

The sliding lock 7 (FIGS. 22-25(*b*)) contains the following major features: curved guiding slots 145 and 145*a*; tracks 136, 136*a*, 137, and 137*a*; the shoulder elements 170, 171, 171*a*, 172 and 170*a*, 171*b*, 171*c*, 172*a*; unlock, angle lock, and full lock markings 149*a*, 148*a*, and 147*a*, respectively. Additionally, these features are all symmetrical about the plane D-D' as shown in FIGS. 24.

Sliding lock component 7 (FIGS. 22-25(*b*)) assembles onto the assembly block 4 (FIGS. 9-12) such that: the translation block 6 (FIGS. 17-21(*b*)) is able to translate unobstructedly towards or away from the protractor component 5 (FIGS. 13-16(*b*)) when the sliding lock 7 is manipulated to one of the locked 147, 148 or unlocked 149 states (FIGS. 28(*a*)-28(*c*)); the sliding lock 7 is able to slide unobstructedly regardless of whether the protractor unit 3 is in a locked 147, 148 or unlocked state 147; the inner surfaces 138 and 138*a* of the translation block 6 are in contact with or in proximity to the outward-facing surfaces of the center bodies 26, 26*a* (FIG. 11) and the minor surfaces 10, 10*a*, 10*b*, 10*c*, 10', 10*b*' of the ruler 2, 2' (FIGS. 1(*a*)-7(*b*)); the curved guiding slots 145 and 145*a* are slidably engaged to the guide elements 40 and 40*a* on the assembly block 4, and the shoulder elements 47 and 47*a* are slidably engaged to the shoulder elements 170, 171, 171*a*, 172 and 170*a*, 171*b*, 171*c*, and 172*a*, regardless of whether the protractor unit 3 is in a locked 147, 148 or unlocked 149 state; the internal sides walls 139 and 141 of the sliding lock 7 act as a stop to the lateral and rotational sliding motion of the sliding lock 7 when the side surfaces 139 and 141 contact the side walls 22, 22*a*, and 22' of ruler 2, 2' (FIGS. 1(*a*)-7(*b*)).

Guiding slots 145 and 145*a* (FIGS. 22-25(*b*)) are slots that are preferably curved in shape, but that can also be of any shape as long as they 145, 145*a* perform their intended function as described herein. These guiding slots 145, 145*a* are intended to slidably engage the guide elements 40 and 40*a* on the assembly block 4 (FIGS. 9-12) such that the sliding lock 7 is able to slide laterally and rotationally without obstruction when the components 4, 5, 6, and 7 are in the assembled state 3 and in order to place the protractor unit 3 in either a locked 147, 148 or unlocked state 149 (FIGS. 28(*a*)-28(*c*)).

The position and cross-sectional dimensions of the guide slots 145 and 145*a* (FIGS. 22-25(*b*)) and orientation of curved surfaces 152 and 152*a*, which characterize the guiding slots 145 and 145*a*, is such that they are concentric with the surfaces 73 and 73*a* (FIGS. 13-16(*b*)) on the protractor component 5 when the components 4, 5, 6, and 7 are in the assembled state 3 and such that when the slots 145 and 145*a* are slid through the guide elements 40 and 40*a* on the assembly block 4 (FIGS. 9-12), the engagement of the guide elements 40 and 40*a* with the curved surfaces 152 and 152*a*, regardless of where along the surfaces 152 and 152*a* this engagement occurs, is such that the sliding lock 7 is situated on the assembly block 4 so as to impart a force on the translation block 6 and the translation block 6 is situated on the assembly block 4 so as to impart a force on the protractor component 5. The force that the translation block 6 imparts on the protractor component 5 creates friction and that friction is sufficient to arrest rotation motion of the protractor component 5, as previously described. Also, when the guide elements 40 and 40*a* engage the curved surfaces 151 and 151*a*, the components 4, 5, 6, and 7, when in assembled, do not cooperate to effect rotational locking of the protractor component 5.

Shoulder elements 170, 171, 171*a*, 172 and 170*a*, 171*b*, 171*c*, 172*a* (FIGS. 22-25(*b*)) on the sliding lock 7 consist of recessed surfaces of varying depth and are intended to slidably engage and cooperate with the shoulder elements 47 and 47*a* on the assembly block 4 (FIG. 9-12) such that the shoulder elements 170, 171, 171*a*, 172 and 170*a*, 171*b*, 171*c*, 172*a* along with shoulder elements 47 and 47*a* and center bodies 26 and 26*a* are able to lock the translational movement of the protractor unit 3 when the protractor unit 3 is slidably engaged to a ruler 2, 2; the mechanism is described in greater detail below. The depths and positions of these shoulder elements 170, 171, 171*a*, 172 and 170*a*, 171*b*, 171*c*, 172*a* should cooperate with the shoulder elements 47 and 47*a* on the assembly block 4 such that these elements 170, 170*a*, 171, 171*a*, 171*b*, 171*c*, 172, 172*a* able to perform their intended functions.

Unlock, Angle Lock, and Full Lock markings 149*a*, 148*a*, and 147*a* (FIGS. 22-25(*b*)), respectively, are reference labels on the sliding lock 7 (FIGS. 22-25(*b*)) that indicate whether the system is either in an unlocked 149 (FIG. 28(*a*)), angle-locked 148 (FIG. 28(*b*)), or full-locked state 147 (FIG. 28(*c*)), which occurs when the sliding lock 7 is slid laterally and rotationally on the assembly block 4 (FIGS. 9-12) as previously described and such that the guide elements 40 and 40*a* on the assembly block 4 are positioned as close to the center positions of these markings 149*a*, 148*a*, and 147*a* as material constraints permit. The action of sliding the sliding lock 7 such that the guide elements 40 and 40*a* are in proximity to any these positions 149*a*, 148*a*, and 147*a*, causes the protractor unit 3 to achieve the particular state 149, 148, 147 that is indicated by the respective reference marking: when the guide elements 40 and 40*a* are in proximity to the Unlock reference marking 149*a*, the protractor unit 3 is in the unlocked state 149, and thus the protractor unit 3 is free to translate and the protractor component is free to rotate; when the guide elements 40 and 40*a* are in proximity to the Angle Lock reference marking 148*a*, the protractor unit 3 is in an angle-locked state 148, and thus, while the protractor unit 3 is free to translate, the protractor component 5 (FIGS. 13-16(*b*)) is not free to rotate; and when the guide elements 40 and 40*a* are in proximity to the Full Lock reference marking 147*a*, the protractor unit 3 is in a fully-locked state 149, and thus, the protractor unit 3 is not free to translate, nor the protractor component 5 is not free to rotate.

Tracks 136 & 137 and 136*a* & 137*a* on the sliding lock 7 (FIGS. 22-25(*b*)) are optional and parallel or concentric with the surfaces 142, 142*a*, and 142*b* on the sliding lock 7 itself and compliment the shape of the tracks 87 & 88 and 87*a* & 88*a* on the translation block 6 (FIGS. 17-21(*b*), respectively, such that the tracks 136 & 137 and 136*a* & 137*a* slidably engage the tracks 87 & 88 and 87*a* & 88*a*, and the sliding lock 7 is able to slide unobstructedly, so that sliding lock 7 can lock 147, 148 or unlock 149 (FIGS. 28(*a*)-28(*c*)) the protractor unit 3 as described herein, when the components 4, 5, 6, and 7 are in the assembled state and the sliding protractor unit 3 is slidably engaged or laterally fastened to a ruler 2, 2', or both.

The sliding lock 7 (FIGS. 22-25(*b*)) is also, preferably, composed of two symmetrical halves 7*a* and 7*b* as shown in FIGS. 25(*a*) and 25(*b*), the purpose of which is to facilitate the assembly of the sliding lock 7 onto the assembly block 4 (FIG. 9-12). These two halves 7*a* and 7*b* can be put together into one part 7 by mating the features 185, 185*a*, 185*b*, and 185*c* on the subcomponent 7*a* with the features 180, 180*a*, 180*b*, 180*c* on the subcomponent 7*b* such that the surfaces 186 and 186*a* and surfaces 181 and 181*a*, respectively, are in contact or in proximity to each other. An adhesive can also be used to achieve a cohesive bond of appropriate strength between the two halves 7*a* and 7*b*.

Referring to FIGS. 1-2 and FIGS. 8-25(*b*), the internal cross-sectional shape and dimensions 46, 76, 105, 160 (FIGS. 8-25(*c*)) of the components 4, 5, 6, and 7, respectively, are to accommodate and compliment the cross-sectional shape and dimensions of the ruler 2, 2' such that when the components 4, 5, 6 and 7 are in the assembled state, these internal cross-sections 46, 76, 105, 160 allow the protractor unit 3 to slide unobstructedly along the length of a ruler 2, 2' or consecutive assembly of rulers 100 (FIGS. 1(*a*)-7(*b*)). Additionally, the top 28, 60, 85, 130 and bottom outer surfaces 28*a*, 60*a*, 85*a*, 130*a* of the components 4, 5, 6, and 7, respectively, are to be proximally coplanar or coplanar when the components 4, 5, 6, and 7 are in the assembled state 3.

Referring to FIGS. 1(a) through 25(b), all fastening features described herein can be of any type, shape or configuration, and either member of each pair can be either the male or female member of the fastening unit, as long as the members of each pair complement each other and allow the parent components and assemblies 2, 3, 4, 5, 6, and 7 to cooperate with each other and function as intended and as described herein; e.g., locking elements 20, 20a, 20b, 20c, and 20' and tracks 16 and 16a; tracks 17, 17a, 17b, 17c, and 17'and locking elements 23a and 23c; snap features 18, 18a, 18b, and 18' and snap features 25, 25a, 25b, and 25c; locking elements 20, 20a, 20b, 20c, and 20' and track 81; snap features 19, 19a, and 19' and snap features 80 and 80a; snap features 55, 55a, 55b, and 55c and features 67 and 67a; slots 61 and 61a and elements 27 and 27a; slots 86 and 86a and features 35 and 35a; slots 145 and 145a and elements 40 and 40a, etc. Further, additional fastening fasteners, elements, or features, such as a pin(s), screws and bolts, rivets, grooves, cams, snap features, taper fits, etc., may be added to any of the above fastening pairs or components in order to complete the intended fastening units or achieve the intended cooperation between components and assemblies 2, 3, 4, 5, 6, and 7.

Figure 26C:
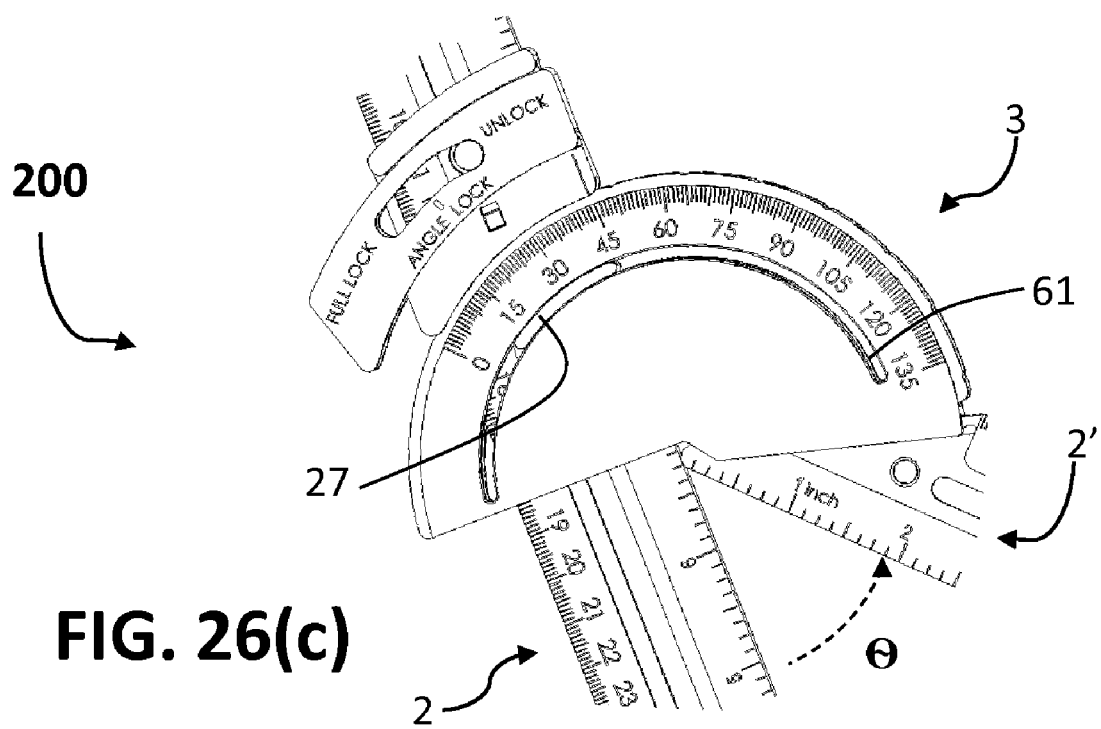
FIG. 26(c) is a magnified view of the protractor unit in FIG. 26(a).
Figure 26D:
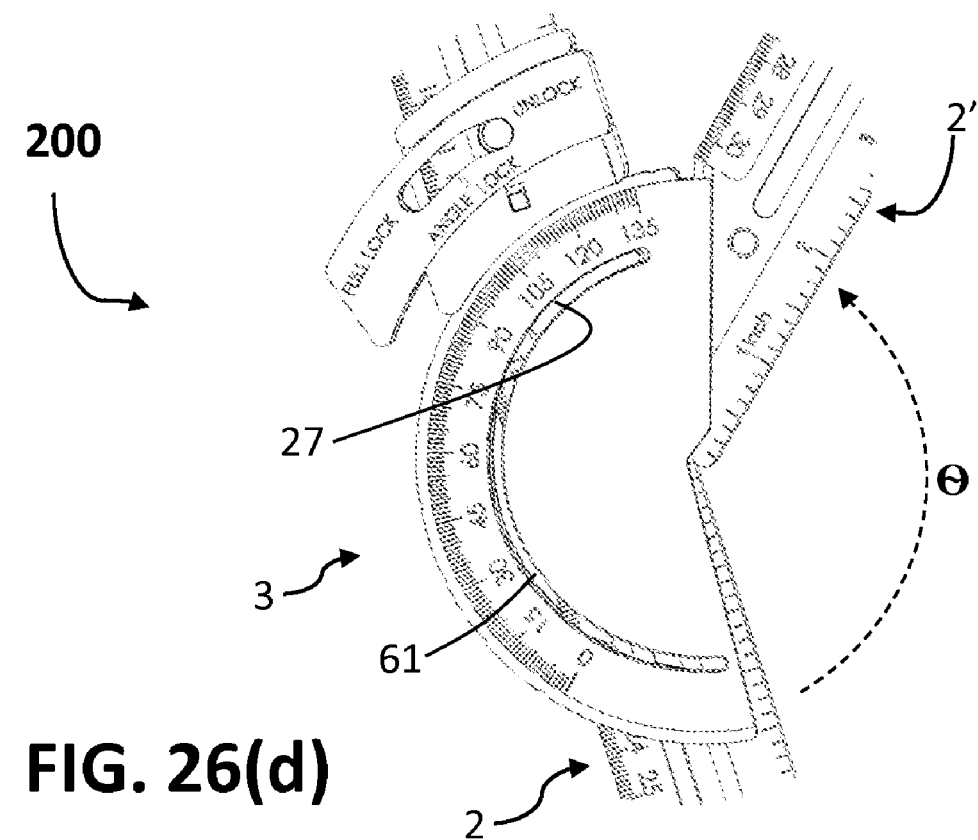
FIG. 26(d) is a magnified view of the protractor unit in FIG. 26(b).

When the components 4, 5, 6, and 7 are in the assembled state or states (FIGS. 8 and 26(a)-33(b)), they compose the protractor unit 3, 3', 3" which itself may be a standalone device that can be manipulated so as to engage and interact with rulers 2, 2' (FIGS. 1(a)-5(c)), consecutive ruler-unit assemblies 100, (FIGS. 6(a)-7(b)), and protractor-ruler assemblies 200 (FIGS. 26(a)-26(c)) to create ruler-protractor super-assemblies, such as assemblies 200, 300, 301, 400, 401, 500, 600, 800, 801 (FIGS. 29(a)-33(b)).

A single protractor unit 3, 3', 3" can simultaneously fasten a maximum of two rulers units 2, 2', 2" (FIGS. 1(a)-4(b)), two ruler assemblies 100 (FIG. 6(b)-7(b)), or two configured protractor-ruler assemblies 200, 300, 301, 400, 401, 500, 600, 800 (FIGS. 26(a)-33(b))—by two different methods: by the first method, the protractor unit 3, 3",3' can be slid onto ruler 2, 2', 2" such that the internal cross-sections 46, 76,105, and 160 (FIGS. 8-25(b)) of the components 4, 5, 6, and 7 (FIG. 8) mate with the external cross-section and shape of a ruler(s) 2, 2', 2", or assemblies containing the same, such that the protractor unit 3, 3', 3" is slidably engaged to a ruler 2, 2', 2", as shown in FIG. 1(a) and in the same manner, the protractor unit 3, 3', 3" can also be unfastened from a ruler 2, 2', 2" being slid of one 2, 2', 2"'; by the second method, the protractor component 5 (FIGS. 13-16(b)) can laterally fasten a ruler 2, 2', 2" to itself 5 as shown in FIGS. 27(a) through 27(c) by use of a semi-permanent snap mechanism and in the same manner, unfasten a ruler 2, 2', 2" from itself 5, as described in detail below.

Referring to FIGS. 27(a) through 27(c), to laterally fasten a ruler 2' to a protractor unit 3, slide a set of male locking elements 20, 20a, 20b, 20c, 20' (FIGS. 2-5(b)), which are located on top and bottom surfaces of the male fasten elements 11, 11a, 11' on either end 13, 13a, 13' of any ruler unit 2' into the track 81 of the protractor component 5 (FIGS. 13-16(b)) on a protractor unit 3 until the pertinent female snap feature 19, 19a, 19' of the ruler 2, 2' fully engage the male snap features 80 and 80a of the protractor component 5. The engagement between the snap features 19, 19a, and 19' and snap features 80 80a is preferably semi-permanent. Also, assuming that the protractor unit 3 is slidably engaged to a first ruler 2, it is intended that - the radius on the tip of the female fastening elements 12, 12a, 12' on the second and laterally fastened unit ruler 2' (FIGS. 27(a)-27(c)) - be tangent or in proximity to the edge 22 of the slidably engaged ruler 2 such that the protractor component 5 of the protractor unit 3 is able to rotate unobstructedly when the components 4, 5, 6, and 7 (FIG. 8) are in the assembled 3 and unlocked state 149 (FIG. 28(a)), as described herein.

Further, the particular end 13, 13a, 13' of a ruler 2, 2' (FIGS. 2-5(b)) that is to be mated with a protractor component 5 (FIGS. 13-16(b)) is typically chosen by selecting the unit measurement system that is preferred for the intended use, since as previously described, the measurement markings are on each minor surfaces 10 & 10b, 10a& 10c of the same top and bottom surfaces of a ruler 2, 2' are of different unit measurement systems (e.g., empirical or metric).

To unfasten a ruler 2, 2' from a protractor unit 3 (FIGS. 27(a)-27(c)), pull the ruler 2, 2' away from the center of the protractor component 5 (FIGS. 13-16(b)) until the snap features 19 and 19a (FIGS. 4(a)-4(d)) of the ruler 2, 2' disengage from the snap features 80 and 80a of the protractor component 5 and such that the locking elements 20, 20a, 20b, 20c on the ruler 2, 2' (FIGS. 2-4(b)) are fully removed from the track 81 of the protractor component 5.

The protractor unit 3 can also be locked at any position along the ruler's 2, 2' length (FIGS. 28(a)-28(c)), when the protractor unit 3 is manipulated to the fully-locked state 147 and while the protractor unit 3 is slidably engaged to a ruler 2, 2'. This fully-locked state 147 (FIG. 28(c)) can be achieve by sliding the sliding lock 7 (FIGS. 22-25(b)) to the full lock position 147a (FIG. 23). The mechanism by which this locking occurs is as follows: as the sliding lock 7 is moved toward the full lock position 147a, the curved guiding slots 145 and 145a on the sliding lock 7 slide through the round guide elements 40 and 40a on the assembly block 4 (FIGS. 9-12), causing the shoulder elements 170 and 170a on the sliding lock 7, which engage the shoulder elements 47, 47a, to slide away from the shoulder elements 47 and 47a until they engage the sloped shoulder elements 171, 171a, 171b, and 171 c; as the sloped shoulder elements 171, 171a, 171b, and 171c are slid past the shoulder elements 47 and 47a, the shoulder elements 47 and 47a are forced towards each other due to intended material interference between the shoulder elements 47 and 47a and the sloped shoulder elements 171, 171a, 171b, and 171c; this causes the center bodies 26, 26a (assembly block 4) and under surfaces 42, 42a to move toward and interfere with the material of the center tracks 8, 8a, 8' of the ruler 2, 2'. This material interference creates sufficient friction to arrest the translation motion of the assembly block 4 and thus, the protractor unit 3. Once the sloped shoulder elements 171, 171a, 171b, and 171 c on are fully slid past the shoulder elements 47 and 47a on the assembly block 4 and engage the shoulder elements 172, 172a, 172b, and 172c the sliding lock 7, the medial displacement of the shoulder elements 47 and 47a is at maximum, as is the friction force, and remains so until the system is manipulated to an angle locked 148 (FIG. 28(b)) or unlocked state 149 (FIG. 28(a)) as described herein.

In order to lock the rotation of the protractor component 5 (FIGS. 13-16(b)) and any ruler 2, 2' that is laterally fastened to the protractor component 5 (FIGS. 27(a)-27(c)) when the components 4, 5, 6, and 7 are in the assembled state 3, the sliding lock 7 (FIGS. 22-25(b)) should be slid to either the Angle Lock 148a or Full Lock 147a position (FIGS. 22 & 23); this action causes the components 4, 5, 6, and 7 to cooperate by the previously described mechanisms to arrest the rotational motion of the protractor component 5 and any ruler 2, 2' that is laterally fastened to the protractor component 5.

The use of the protractor unit 3, 3' in conjunction with the other rulers 2, 2' as described herein is the overall basis of at least one embodiment of the invention; thus, when the protractor unit 3, 3', 3" is both slidably engaged and laterally fastened to rulers 2, 2', as shown in FIGS. 26(a)-26(b) and 29(a)-33(b), the protractor unit's components 4, 5, 6, and 7, all subcomponents of these components 4, 5, 6, and 7, and all bodies, features and sub-features of these components 4, 5, 6 and 7 cooperate with each other and each other's movement such that these components 4, 5, 6, and 7 are able to function as intended and as described herein.

Generally referring to FIGS. 26(a) through 33(b), rulers 2, 2', 2" and protractor units 3, 3', 3" can be configured in pluralities to create myriad of different and complex geometric assemblies; e.g., assemblies 200, 300, 301, 400, 401, 500, 600, 800, 801. The inner edges 22, 22a, 22' of rulers 2, 2', 2" in these geometric assemblies create geometric and polygonal shapes. Both open-shaped assemblies 300, 401, 600, 801 and closed-shaped assemblies, such as triangles 301, squares 400, pentagons 500, octagons 800, etc., can be created. Additionally, any geometric assembly can be varied by: (i) changing the angle between and two rulers 2, 2', 2" (FIG. 26(a)-26(b)) or sets of rulers 2, 2', 2" within the geometric assembly; (ii) by changing the scale or size of the geometric shape that characterizes a particular assembly, which can be done by sliding the protractor units 3, 3', 3" along any ruler 2, 2', 2" that the protractor unit 3, 3', 3" is slidably engaged to (e.g., the square assembly 400 in FIG. 30(b) is larger than the square assembly 400 in FIG. 30(a), but both create square shapes); (iii) rulers 2, 2', 2" can be consecutively fastened to other rulers 2, 2', 2" in ruler-protractor assemblies to form complex assemblies 600; and (iv) multiple protractor units 3, 3', 3" can slidably engage the same ruler 2, 2', 2" or assembly of consecutively-fastened rulers 100 (FIG. 6(a)-6(b)) to form even more complex assemblies, super assemblies, and so on.

Also, when rulers 2, 2', 2" are configured in the said assemblies, such as assemblies 200, 300, 301, 400, 401, 500, 600, 800, and 801, the respective top and bottom surfaces of all rulers 2, 2', 2" within each assembly should closely all align or lie in the same plane, as should the respective top and bottom surfaces of all protractor units 3, 3', 3" and all components 4, 5, 6, 7 of protractor units 3, 3', 3".

Additionally, when geometric assemblies, such as assemblies 200, 300, 301, 400, 401, 500, 600, 800, and 801, are created by selecting the same unit measurement system marking (e.g., inches) to be near the inner edges 22, 22a, 22' of each ruler 2, 2', 2" in the assembly, the entire assembly 200, 300, 301, 400, 401, 500, 600, 800, 801 can be flipped over so that the marking along the internal edges of each ruler 2, 2', 2" can then be read in the complimentary system (e.g., centimeters).

Last, it should be understood that the descriptions and examples of the invention stated herein are merely meant to be illustrative, rather than restrictive, as manifold variations of this invention, all components of this invention, and all features and sub-features of those components can reasonably be anticipated anyone skilled in the art.

Second Embodiment

In another embodiment, each of the components 2, 2', 2", 3, 3', 3", 4, 5, 6, and 7 would function as previously described, but with a few exceptions: (i) the ruler 2, 2', 2" as shown in FIGS. 1(a)-7(b) and FIGS. 26(a)-33(b), would not contain the tracks 8, 8', and 8a, and rulers 2, 2', 2" external cross-sectional shape would not be rectangular as shown in FIGS. 4(a) and 4(d), but circular, center bodies 26 and 26a on the assembly block 4 (FIGS. 9-12) would not be recessed from the main block 56, but an extension of the main block's 56 itself such that the surfaces 28 and 28a on the main block 56 are tangent with the outward facing surfaces of the center bodies 26 and 26a, respectively, and such that the under surfaces 42 and 42a of the center bodies 26 and 26a do not interrupt the internal cross-sectional dimension 46 of the assembly block 4, but are tangent with the surfaces 48 and 48a of the main block; the internal cross-sectional shapes and dimensions 46, 76, 105, 160 (FIGS. 8-25(c)) of the components 4, 5, 6, and 7, respectively, should be tubular and should accommodate or otherwise compliment the external cross-sectional shape and dimensions of the ruler 2, 2', 2" such that when the components 4, 5, 6 and 7 are in the assembled state of the protractor unit 3, 3', 3", these internal cross-sections 46, 76, 105, 160 allow the protractor unit 3, 3', 3" to slide unobstructedly along a ruler 2, 2' or consecutive assembly of rulers 100 (FIGS. 1(a)-7(b)).

The external cross-sectional shapes of the components 4, 5, 6, and 7 under this embodiment are generally circular, too, and should substantially accommodate all features, sub-features, bodies, and the internal cross-sectional shapes 46, 76, 105, 160 of each component 4, 5, 6, and 7, respectively, as described herein.

The variation in the external cross-sectional shape of the ruler 2, 2', 2" and internal cross-sectional dimensions 46, 76, 105, 160 of the components 4, 5, 6, and 7, not only allows the protractor unit 3, 3', 3" to slidably engage the ruler 2, 2', 2", it confers an additional benefit: the siding protractor unit 3, 3', 3" itself can now be rotated around the ruler 2, 2', 2" in to the $3^{rd}$ dimension and slide along a ruler 2, 2', 2"; thus, rulers 2, 2', 2" can be laterally fastened to protractor unit 3, 3', 3" in the $3^{rd}$ dimension, while the protractor unit 3, 3', 3" is still able to rotate in order to create angles between slidably engaged and laterally fastened ruler 2, 2', 2".

Additionally, rulers, under this embodiment, would have both linear distance measurement markings (e.g., centimeters, inches, etc.) and angle measurement markings at select locations on the circumferential surface of their cylindrical shape (circular cross-section) so that these marking do not interfere with each other. The former are to be oriented longitudinally along the ruler, and the later are to be oriented circumferentially about the circumferential surface of the ruler. Further, the said angle marking indicate the angle of rotation between the ruler and the protractor unit when the protractor unit is rotated about the longitudinal axis of a slidably engaged ruler(s).

Lateral fastening of a ruler 2, 2', 2" to the protractor components 5 (FIGS. 27(a)-27(c)) of protractor units 3, 3', 3" would still work in the manner previously described, as would the fastening of rulers 2, 2', 2" to rulers 2, 2', 2" to create consecutive ruler assemblies 100 (FIG. 6(a)-7(b)). Rulers 2, 2', 2" would contain the same fastening features, elements, and sub-features at each of their ends 13, 13a, 13' The triangular-shaped ends 13, 13a, 13' of each ruler 2, 2', 2" could still have a rectangular cross-section for mating purposes, or can be circular, as long as all of the male and female mating features on the rulers 2, 2', 2" ends 13, 13', 13" are adjusted appropriately to cooperate with fastening to other the rulers 2, 2', 2" for purpose of creating consecutive-ruler assemblies 100 and to the protractor components 5 for the purpose of creating ruler-protractor assemblies 200 (FIGS. 26(a)-27(c)).

The protractor component 5 (FIGS. 13-16(b)), under this embodiment, would also have a swivel or rotatable block preceding the fastening features and mechanism responsible for laterally fastening the protractor unit to rulers. Rotation of the said block would break the plane of the protractor component and would allow rulers to be twisted into the $3^{rd}$ dimension when rulers are laterally fastened to protractor components. Further, rotation of this block also allows all three degrees of rotation—i.e., rotation about the x-, y-, and z-axis, to be covered by the design, so that there are no orientation related mating issues between rulers and protractor units when they are mating to each other in the 3$^{rd}$ dimension. Additionally, the rotating block or the part of the protractor component that it is attached to can also have angle markings on its external surfaces so that the angle of rotation can be measured or selected as well.

Additionally, components 4, 5, and 6, as well as all features, sub-features, and bodies of these components 4, 5, and 6 and assemblies would function in the same general manner as previously described. The sliding lock 7 (FIGS. 22-25(*b*)), however, due to its circular internal and external cross-sectional shape, under this embodiment, would function differently than previously described: instead of sliding to achieve angle locking 148, full locking 147, and unlocking (FIGS. 28(*a*)-28(*c*)) of the protractor unit when the protractor unit is slidably and laterally engaged to rulers, the sliding lock would rotate to achieve locking and unlocking of the protractor unit. The mechanism by which the sliding lock achieves these locked and unlocked states would remain the same as those described in the first embodiment.

The curved slots 145 and 145*a* on the sliding lock 7 (FIGS. 22-25(*b*)), under this embodiment, would still slidably engage the guide elements 40 and 40*a* on the assembly block 4 (FIGS. 28(*a*)-28(*c*)), but would not be mirror images of each other 145 and 145*a*, as described in the first embodiment; instead they 145 and 145*a* would be rotational symmetrical to each other, as would the orientation of the shoulder elements 170, 171, 171*a*, 172 and 170*a*, 171*b*, 171*c*, 172*a*, respectively. All other aspects of the sliding lock remain the same and function as described in the first embodiment.

Ultimately, geometric assemblies, such as assemblies 200, 300, 301, 400, 401, 500, 600, 800, and 801, can be made even more complex by rotating either the protractor unit or the rotating block on the protractor unit, or both, into the 3$^{rd}$ dimension.

Third Embodiment

In another embodiment, all components 2, 2', 2", 4, 5, 6, and 7 (FIGS. 1(*a*)-25(*b*)), as well as their features and sub-features, and assemblies 3, 3', 3", 100, 200, 300, 301, 400, 401, 500, 600, 800, 801 (FIGS. 26(*a*)-33(*b*)) would function in the same manner as previously described in the first two embodiments; however, the only difference would be that features 27 and 27*a* on the assembly block 4 (FIGS. 9-12) and features 61 and 61*a* on protractor component 5 (FIGS. 13-16(*b*)) would not be positioned at a radius 900 (FIG. 10), but rather the center point 901 of the circle corresponding to the radii of the surfaces 73 and 73*a* of the protractor component 5, and features 27, 27*a* and 61, 61*a* would not slidably engage each other as in the first two embodiments, but rotationally engage each other. The position of the pivot point, which is in fact intended to be the same point as the center point 901 of the circle 900 created by the surfaces 73 and 73*a*, is to be selected as described in the first embodiment.

What is claimed is:

1. A measuring tool comprising:
   a ruler having a first end, a second end opposite the first end, and a length extending between the first and the second ends of the ruler; and
   a protractor unit coupled to the ruler, the protractor unit operable to slide along at least a portion of the length of the ruler between the first end and the second end, wherein the protractor unit comprises:
   a sliding lock movable between at least a first position, a second position, and a third position, wherein the protractor unit is operable with the sliding lock in the first position to slide freely along the length of the ruler and in the second position to be locked against sliding along the length of the ruler, and
   a protractor component pivotally coupled to the protractor unit, wherein the protractor component is operable with the sliding lock in at least the first position to pivot freely on the protractor component and in at least the third position to be locked against pivoting on the protractor component.

2. The measuring device of claim 1, wherein the ruler has at least one surface that extends between at least a portion of the length the ruler and the protractor unit has at least one surface located within a proximity of the at least one surface of the ruler, and wherein in the second position the sliding lock presses the at least one surface of the protractor unit against the at least one surface of the ruler.

3. The measuring device of claim 1, wherein the protractor component has at least one surface and the protractor unit has at least one other surface located within a proximity of the at least one surface of the protractor component, and wherein in the third position the sliding lock presses the at least one surface of the protractor component against the at least one surface of the protractor unit.

4. The measuring device of claim 1, wherein the ruler comprises complimentary fastening features at each end of the ruler, the ruler therewith operable to be removably fastened to another ruler at each end.

5. The measuring device of claim 4, wherein the complimentary fastening features comprise at least one male fastening feature and at least one female fastening feature, and wherein the ruler is operable to be removably fastened to another ruler by engaging the male and female fastening features of one end of the ruler with the respective female and male features of an end of another ruler.

6. The measuring device of claim 5, wherein each of the ends is oriented diagonally relative to the length of the length of the ruler and rotationally symmetric to the other end of the ruler.

7. The measuring device of claim 4, wherein the protractor unit comprises complimentary fastening features, the protractor unit therewith operable to be removably fastened to another ruler.

8. The measuring device of claim 7, wherein complimentary fastening features comprise at least one male fastening feature and at least one female fastening feature, and wherein the protractor unit is operable to be removably fastened to another ruler by engaging the male and female fastening features of the protractor with the respective female and male features of an end of another ruler.

9. The measuring device of claim 1, wherein the protractor unit comprises an assembly block, a semicircular protractor component pivotally coupled to the assembly block, and a translation block and a sliding lock movably coupled to the assembly block, the assembly block is slidably coupled to the ruler, and each of the assembly block, the protractor component, the translation block and the sliding lock each have at least one surface.

10. The measuring device of claim 9, wherein the at least one surface of the ruler extends between at least a portion of the length the ruler and the at least one surface of the assembly block is within a proximity of the at least one surface of the ruler, and wherein in the second position the sliding lock presses the at least one surface of the assembly block against the at least one surface of the ruler.

11. The measuring device of claim 10, wherein ruler comprises a plurality of surfaces located on opposite sides of the ruler that extend between at least a portion of the length the ruler and the assembly block comprises a plurality of surfaces each within a proximity of at least one of the plurality of the surfaces of the ruler, and wherein in the second position the sliding lock presses each of the plurality of surfaces of the assembly block against at least one of the plurality of the surfaces the ruler.

12. The measuring device of claim 9, wherein the at least one surface of the translation block is within a proximity of the at least one surface of the protractor component, and wherein in the third position the sliding lock presses the at least one surface of the translation block against the at least one surface of the protractor component.

13. The measuring device of claim 12, wherein the translation block comprises a plurality of surfaces and the protractor component comprises a plurality of surfaces each within a proximity of at least one of the surfaces of the translation block, and wherein in the third position the sliding lock presses each of the plurality of surfaces of the translation block against at least one of the plurality of the surfaces the protractor component.

14. The measuring device of claim 9, wherein the at least one surface of the sliding lock is within a proximity of the at least one surface of the assembly block, and wherein in at least the third position the sliding lock presses the at least one surface of the sliding lock against the at least one surface of the assembly block.

15. The measuring device of claim 14, wherein the sliding lock comprises a plurality of surfaces and the assembly block comprises a plurality of surfaces each within a proximity of at least one of the surfaces of the sliding lock, and wherein in the third position the sliding lock presses each of the plurality of surfaces of the sliding lock against at least one of the plurality of the surfaces the assembly block.

16. The measuring device of claim 14, wherein the at least one surface of the translation block is within a proximity of the at least one surface of the protractor component, and wherein in the third position the sliding lock presses the at least one surface of the translation block against the at least one surface of the protractor component.

17. The measuring device of claim 16, wherein the translation block comprises a plurality of surfaces and the protractor component comprises a plurality of surfaces each within a proximity of at least one of the surfaces of the translation block, and wherein in the third position the sliding lock presses each of the plurality of surfaces of the translation block against at least one of the plurality of the surfaces the protractor component.

18. A measuring tool comprising:
a ruler having a first end, a second end opposite the first end, and a length extending between the first and the second ends of the ruler; and
a protractor unit coupled to the ruler, the protractor unit operable to slide along at least a portion of the length of the ruler between the first end and the second end, wherein the protractor unit comprises:
an assembly block,
a semicircular protractor component pivotally coupled to the assembly block, and
a translation block and a sliding lock movably coupled to the assembly block, wherein the assembly block is slidably coupled to the ruler, and each of the assembly block, the protractor component, the translation block and the sliding lock each have at least one surface, the sliding lock is movable between at least a first position, a second position, and a third position, and wherein with the sliding lock in the first position the protractor unit is operable to slide freely along the length of the ruler and the protractor unit is operable to pivot freely on the assembly block, with the sliding lock in at least the second position the assembly block is locked against sliding along the length of the ruler, and with the sliding lock in at least the third position the protractor component is locked against pivoting on the assembly component, and wherein the at least one surface of the ruler extends between at least a portion of the length the ruler and the at least one surface of the assembly block is within a proximity of the at least one surface of the ruler, and in the second position the sliding lock presses the at least one surface of the assembly block against the at least one surface of the ruler, and wherein the at least one surface of the translation block is within a proximity of the at least one surface of the protractor component, and wherein in the third position the sliding lock presses the at least one surface of the translation block against the at least one surface of the protractor component, and wherein the at least one surface of the sliding lock is within a proximity of the at least one surface of the assembly block, and wherein in at least the third position the sliding lock presses the at least one surface of the sliding lock against the at least one surface of the assembly block.

19. A measuring tool comprising:
a ruler having a first end, a second end opposite the first end, and a length extending between the first and the second ends of the ruler, wherein the ruler comprises complimentary fastening features at each end of the ruler, the ruler therewith operable to be removably fastened to another ruler at each end; and
a protractor unit coupled to the ruler, the protractor unit operable to slide along at least a portion of the length of the ruler between the first end and the second end, wherein the protractor unit comprises complimentary fastening features, the protractor unit therewith operable to be removably fastened to another ruler.

* * * * *